(12) United States Patent
Vanier et al.

(10) Patent No.: US 8,980,086 B2
(45) Date of Patent: Mar. 17, 2015

(54) WASTE SEPARATION AND PROCESSING SYSTEM

(75) Inventors: Jay Vanier, Hemphill, TX (US); Rick Simmons, Saline, KS (US); Bryan Thibodeaux, Basile, LA (US)

(73) Assignee: Midwestern IP, LLC, Manhattan, KS (US)

( * ) Notice: Subject to any disclaimer, the term of this patent is extended or adjusted under 35 U.S.C. 154(b) by 851 days.

(21) Appl. No.: 12/971,101

(22) Filed: Dec. 17, 2010

(65) Prior Publication Data
US 2012/0152861 A1    Jun. 21, 2012

(51) Int. Cl.
| | | |
|---|---|---|
| *B01D 17/00* | (2006.01) | |
| *B03C 5/02* | (2006.01) | |
| *B03C 3/30* | (2006.01) | |
| *C05F 3/06* | (2006.01) | |
| *C05F 7/00* | (2006.01) | |
| *B01D 21/00* | (2006.01) | |
| *B01D 21/01* | (2006.01) | |
| *B01D 21/02* | (2006.01) | |

(52) U.S. Cl.
CPC ... *B03C 5/02* (2013.01); *B03C 3/30* (2013.01); *C05F 3/06* (2013.01); *C05F 7/00* (2013.01); *B01D 21/0009* (2013.01); *B01D 21/01* (2013.01); *B01D 21/02* (2013.01); *B01D 2221/06* (2013.01)
USPC ....... 210/252; 210/333.01; 210/408; 210/326

(58) Field of Classification Search
USPC .......................................... 210/252
See application file for complete search history.

(56) References Cited

U.S. PATENT DOCUMENTS

| | | | | |
|---|---|---|---|---|
| 3,581,903 | A | * | 6/1971 | Holz .............................. 210/415 |
| 4,117,776 | A | * | 10/1978 | Hunt ............................. 100/117 |
| 4,266,473 | A | | 5/1981 | Hunt |
| 4,279,197 | A | | 7/1981 | Hunt |
| 4,397,230 | A | | 8/1983 | Hunt |
| 4,719,933 | A | * | 1/1988 | Jackson .......................... 134/65 |
| 5,009,795 | A | | 4/1991 | Eichler |
| 5,205,930 | A | | 4/1993 | Obrestad |
| 5,482,629 | A | | 1/1996 | Rippetoe |
| 5,554,301 | A | * | 9/1996 | Rippetoe et al. ......... 210/748.01 |
| 6,106,787 | A | | 8/2000 | Rippetoe |
| 6,394,042 | B1 | | 5/2002 | West |
| 6,395,187 | B1 | | 5/2002 | Alanis |
| 6,651,822 | B2 | | 11/2003 | Alanis |
| 7,001,512 | B1 | | 2/2006 | Newsome |
| 7,344,637 | B2 | | 3/2008 | Frommann |
| 7,674,379 | B2 | | 3/2010 | Vanotti et al. |
| 2005/0236320 | A1 | * | 10/2005 | Didion ........................ 210/323.1 |
| 2008/0203014 | A1 | * | 8/2008 | Magner et al. ................. 210/603 |
| 2009/0127176 | A1 | * | 5/2009 | Cummins ..................... 210/192 |
| 2009/0249685 | A1 | * | 10/2009 | Flowers et al. ................. 44/605 |
| 2010/0018909 | A1 | | 1/2010 | Smith |

\* cited by examiner

*Primary Examiner* — Tony G Soohoo
*Assistant Examiner* — Peter Keyworth
(74) *Attorney, Agent, or Firm* — Goodman, Allen & Filetti, PLLC; Matthew R. Osenga

(57) ABSTRACT

A multi-stage method of reducing solids and contaminants from liquid waste and other suitable streams without the use of chemical flocculants or polymers is disclosed.

7 Claims, 24 Drawing Sheets

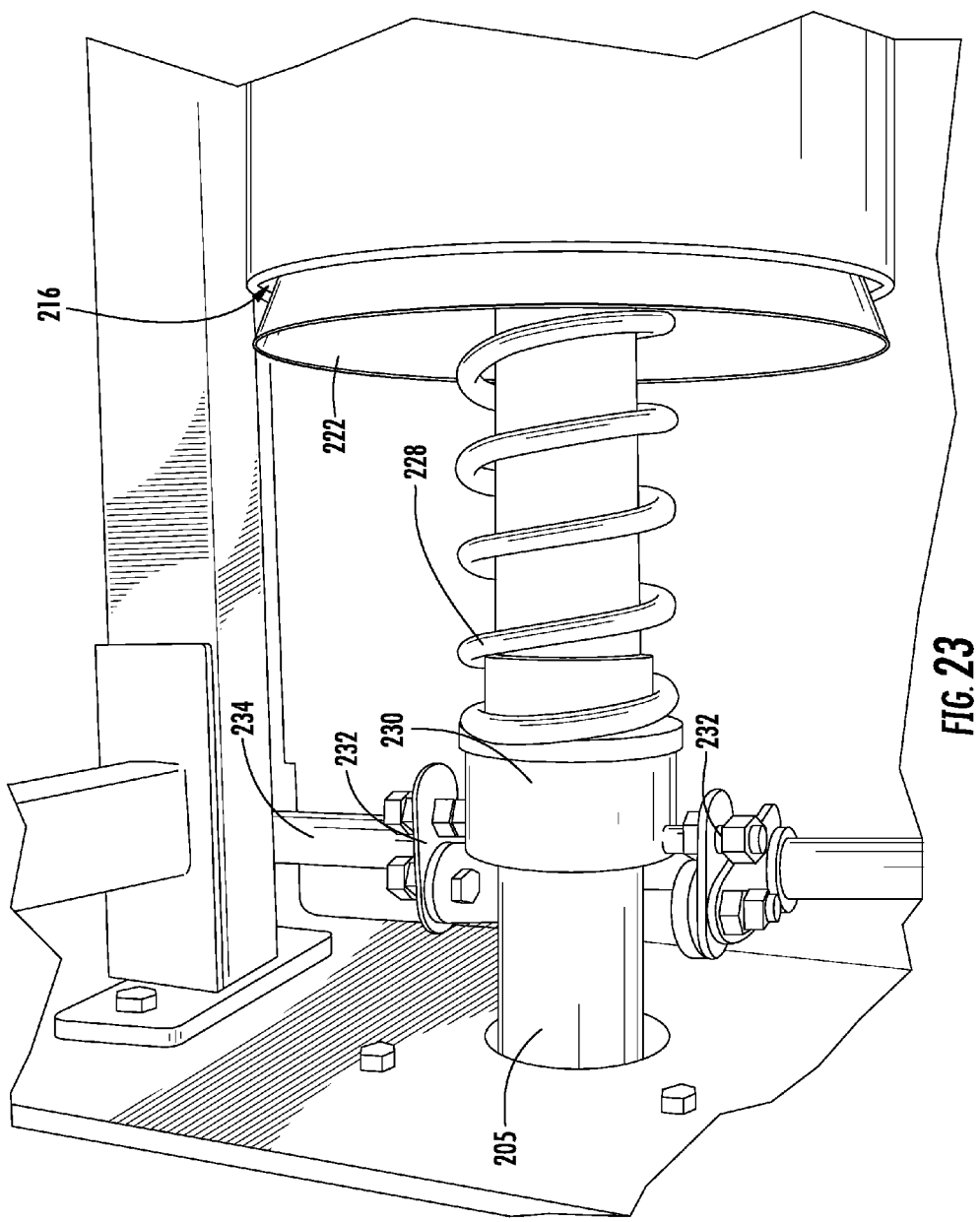

WASTE SEPARATION AND PROCESSING SYSTEM

BACKGROUND OF THE INVENTION

This invention relates in general to the separation and handling of waste. Embodiments of this invention relate to the solid separation and cleaning of part-liquid animal waste streams.

Concentrated Animal Feedlot Operations ("CAFOs") are often required to prepare Nutrient Management Plans ("NMPs") dealing with how the animal waste may be applied to cropland. A number of NMPs are based on the most limiting nutrient found in the animal waste. Federal regulations dictate NMPs, expanding the coverage of the Clean Water Act from the production facility to the land where animal waste is to be applied. Other regulations may dictate how CAFOs prepare NMPs.

In general, the application of waste on the land may be restricted based on the nutrient content and concentration in the waste. Such restrictions increase the competition for and the value of "spreadable" land (land capable of using animal waste as a plant fertilizer), inflating overall manure management costs. In some phosphorus-based NMPs, the overall management costs are even higher since animal waste can contain more phosphorus than nitrogen relative to plant needs, meaning that less waste may be spread on a given acre under such a NMP.

Typical 180 bushel acre corn may require approximately 240 pounds per acre of nitrogen, 100 pounds per acre $P_2O_5$, and 240 pounds per acre of $K_2O$, or in other words, a 10:4:10 ratio of N:P:K. Typical swine waste may have an N:P:K: ratio of 10:9:8. Non-efficient recycling of swine waste in such a setting may require recycling only small amounts of swine waste per acre so as to minimize overloading of the land (i.e. accumulation of excess levels of $P_2O_5$ not utilized by the crops).

A pregnant sow may produce about 9 pounds of waste per day, with a solid content approximately ranging from 2 to 4.5% solids by volume. Beef cattle with an 800 pound average weight may produce about 48 pounds of waste per day with approximately 15% solids by volume. Dairy cattle weighing an average of 1300 pounds may produce about 50-95 pounds of waste per day with approximately 15% solids by volume.

By separating animal waste into a solid component and a liquid component, CAFOs may be able to handle the animal waste more efficiently. Separated solid components are rich in contaminants, compared to untreated slurry, and may be allowed to collect for longer periods of time before removal. Meanwhile, the liquid component, with reduced levels of contaminants, may be further used, such as for irrigation purposes. Additionally, reduction in the solids component of an animal waste stream may lead to longer life and less maintenance for equipment carrying the waste. Additionally, reduction in the solids component of an animal waste stream may greatly extend the life of settling lagoons.

Current methods of separating animal waste into solid and liquid components are slow processes that often require a very large footprint. Additionally, current methods of separating animal waste into solid and liquid components hinder growth of many operations due to the amount of space and money required to properly handle the increase in animal waste. As well, current methods of separating animal waste into solid and liquid components may not effectively reduce levels of contaminants in the liquid component.

Additionally, animal waste to be processed from certain CAFOs, such as dairy farms, contain a quantity of sand that can have an adverse effect on the life and efficiency of current waste treatment machinery.

SUMMARY OF THE INVENTION

This invention relates to the separation and handling of animal waste. This invention also relates to removal of dissolved solids, dewatering, and increasing the settling rate of the suspended solids in an animal waste stream.

In various embodiments, the invention comprises a first separation stage configured to receive a slurry that contains contaminants and to separate the slurry into a solid stream and a first liquid stream, the first liquid stream having a substantially lower solid content than the slurry; an activator stage in fluid communication with the first separation stage, the activator stage configured to receive the first liquid stream and pass the first liquid stream over an activator surface to produce an activated liquid stream, the activated liquid stream including charged particles; wherein the charged particles attract the contaminants to form contaminant particles within the activated liquid stream; and a final separation stage in fluid communication with the activator stage, the final separation stage configured to receive the activated liquid stream and to separate the contaminant particles from the activated liquid stream. The invention may include a spray bar positioned in proximity to the first separation stage and configured to direct spray bar fluids towards the filter. The invention may include a filter for separating the slurry into a first liquid stream and a solid stream. The invention may include a rotating drum filter.

Embodiments of the invention may also include a dewatering stage configured to receive the solid stream and to separate the solid stream into a second liquid stream and a solid waste stream, wherein the second liquid stream is combined with the first liquid stream prior to entering the activator stage. A dewatering stage may include a screw press, the screw press having a central drive shaft, a solids output, and an occluding piece, the occluding piece being located along the central drive shaft and near the solids output, the occluding piece having an outer surface capable of partially occluding the solids output. The invention may include a cleaning nozzle positioned in proximity to the dewatering stage and configured to direct cleaning nozzle fluid towards the screw press. The screw press may be integrated within at least a portion of the first separation stage. In some embodiments, the occluding piece may be capable of being fixed axially with respect to the central drive shaft. In some embodiments, the occluding piece may be fixed rotationally with respect to the central drive shaft and may be adapted with at least one fin extending away from the outer surface. In some embodiments, the occluding piece may be axially biased by a biasing spring, the biasing spring having a first end being axially adjustable by an adjustment mechanism and a second end axially supporting the occluding piece.

In some embodiments of the invention, the system may additionally comprise a heater adapted to provide heat energy to at least one of the slurry, the first liquid stream, and the activated liquid stream.

In some embodiments of the invention, the activator stage may include a barrier between a first activator volume and a second activator volume, the first activator volume being in fluid communication with the second activator volume via a plurality of openings in the barrier, the activator surface being in fluid contact with the second activator volume. The barrier may be plurality of tube walls defining a plurality of tubes, the first activator volume being defined in part by the plurality of tubes, the second activator volume being defined in part as a space between the plurality of tubes and the activator surface. In some embodiments, the system may additionally include a backwashing system configured to pressurize a backwashing fluid from the second activator volume into the first activator volume.

In some embodiments, the invention may additionally comprise a pump configured to transport the slurry into the first separation stage, and a pressurizing mechanism configured to pressurize the first liquid stream through the activation stage. The pressurizing mechanism may be an impeller pump.

In various embodiments, this invention comprises the steps of passing a slurry through a first separation stage to separate the slurry into a solid stream and a first liquid stream, the first liquid stream having a substantially lower solid content than the slurry; passing the first liquid stream over an activator surface to produce an activated liquid stream that includes charged particles; wherein the charged particles attract the contaminants to form contaminant particles within the activated liquid stream; and passing the activated liquid stream through a final separation stage to separate the contaminant particles from the activated liquid stream. In some embodiments, the invention also comprises the steps of passing the solid stream through a dewatering stage to separate the solid stream into a second liquid stream and a solid waste stream; and combining the second liquid stream with the first liquid stream.

In some embodiments, the step of passing the solid stream through a dewatering stage includes the steps of providing a forward motive force to push the solid stream towards a solids output, and providing backpressure on at least a portion of the solid stream by occluding at least a portion of the solids output with an occluding piece, wherein the occluding piece is spring-biased in a direction opposite the forward motive force. In alternate embodiments, the step of passing the solid stream through a dewatering stage includes the steps of providing a forward motive force to push the solid stream towards a solids output, and providing backpressure on at least a portion of the solid stream by occluding at least a portion of the solids output with an occluding piece, wherein the occluding piece is rotated with respect to the solids output, the occluding piece having at least one fin positioned to contact a portion of the solid waste stream as it exits the solids output.

In some embodiments, the invention additionally comprises the step of fracturing a quantity of remaining solids within the first liquid stream before the first liquid stream is passed over the activator surface.

In some embodiments, the invention additionally comprises the step of heating at least one of the slurry, the first liquid stream, and the activated liquid stream.

In some embodiments, the invention additionally comprises the step of backwashing an activator unit, the activator unit housing the activator surface.

In an embodiment, the invention comprises a first separation device consisting of a screw press positioned partially within a rotating drum filter, the rotating drum filter having a drum screen and a rotating frame with scoops, wherein the rotating drum is adapted to separate a slurry into a first liquid stream that exits through the drum screen and a solid stream that is lifted by the scoops and dropped into the screw press, wherein the screw press is configured to provide a forward motive force to push the solid stream towards a solids output by rotating an auger attached to a central drive shaft and the screw press is configured to provide backpressure upon the solid stream by occluding at least a portion of the solids output with an occluding piece, wherein the occluding piece is rotationally coupled to the central drive shaft, the occluding piece having at least one fin positioned to contact a portion of a solid waste stream as it exits the solids output, wherein the screw press is adapted to separate the solid stream into a second liquid stream and a solid waste stream, the first separation device configured to route the second liquid stream into the rotating drum filter to allow the second liquid stream to be re-screened and thus mixed with the first liquid stream to create a combined liquid stream; a spray bar positioned in proximity to the rotating drum filter and configured to spray a pressurized spray bar fluid through the drum screen; a cleaning nozzle positioned in proximity to the screw press and configured to spray a pressurized cleaning nozzle fluid onto the screw press; an impeller pump configured to pressurize the combined liquid stream through an activator device in a forward direction, wherein the activator device includes a barrier between a first activator volume and a second activator volume, the first activator volume being in fluid communication with the second activator volume via a plurality of openings in the barrier, an activator surface positioned within close proximity of the plurality of openings in the barrier, wherein the activator device is configured such that the pressurized flowing of the combined liquid stream through the plurality of openings in the barrier and past the activator surface results in an activated liquid stream, the activated liquid stream including charged particles, wherein the charged particles attract the contaminants to form contaminant particles within the activated liquid stream; a backwashing system configured to pressurize a backwashing fluid through the activator device in reverse direction; and a second separation device adapted to receive the activated liquid stream and allow the contaminant particles to settle, resulting in a portion of clean water separable from a plurality of settled particles.

Various advantages of this invention will become apparent to those skilled in the art from the following detailed description of the preferred embodiment, when read in light of the accompanying drawings.

DESCRIPTION OF THE DRAWINGS

The drawings described herein are for illustration purposes only and are not intended to limit the scope of the present disclosure in any way. None of the representations or diagrams included with this disclosure is intended to represent actual scale or relative scale of the objects they are representing.

FIG. 23 is a representation of an exemplary spring-controlled cone with an associated control mechanism, located at the output of the dewatering unit.

DETAILED DESCRIPTION

Figure 1:
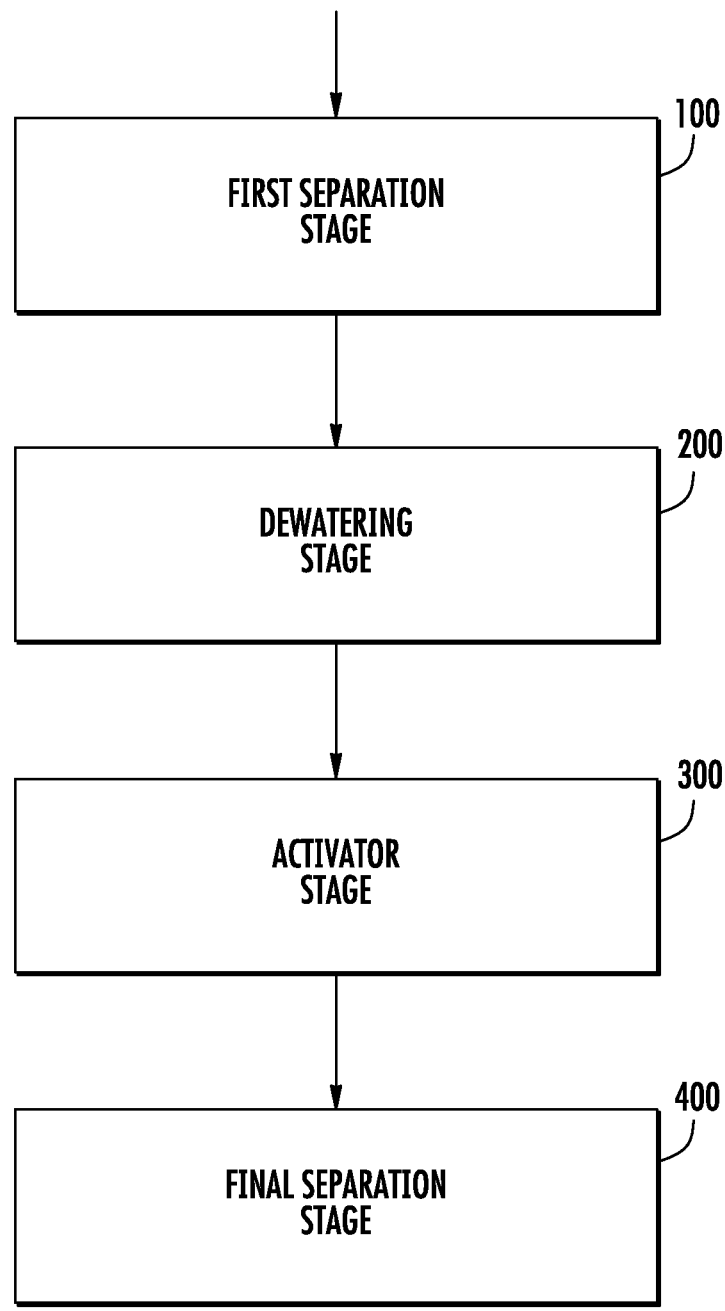
FIG. 1 is a high-level schematic flow chart of a waste separation and processing system.

The following description is merely exemplary in nature and is not intended to limit the present disclosure, application, or uses. It should be understood that throughout the drawings, corresponding reference numerals indicate like or corresponding parts and features.

Numeric values and ranges are provided for various aspects of the implementations described. These values and ranges are to be treated as examples only and are not intended to limit the scope of the claims. In addition, a number of materials are identified as suitable for various facets of the implementations. These materials are to be treated as exemplary and are not intended to limit the scope of the claims.

In general, the implementations described below involve combinations of parts or components that may be referred to as "stages." As used herein, a "system" is a combination of two or more parts, components, or stages that together can function as a whole. The stages may be connected by pipes, tubes, hoses or similar structures that can provide fluid communication therebetween.

A multi-stage system and method is disclosed for processing streams of liquid or slurry waste. As used in this disclosure, the term stream includes any quantity of matter that moves through the system between or within one or more stages and has some liquid component or some amount of moisture. Examples of streams can include waste streams such as manure streams. The disclosed system and method can reduce the levels of contaminants in a waste stream. As used herein, the term "slurry" refers to a suspension of solid particles in a liquid; a slurry can be a type of stream.

As used in this disclosure, the term "contaminants" includes any solid, liquid or gaseous particles or elements that are suspended or dissolved in the stream from which removal from the stream may be desired. Such contaminants may include, but are not limited to, nitrogen, phosphorus, potassium, sulfur, calcium, magnesium, sodium, and chlorine. Contaminants can include these substances in their elemental forms as well as in compounds. Examples of such compounds include ammonium compounds such as $NH_4NO_x$, phosphorus compounds such as phosphorus oxide ($P_2O_5$), potassium compounds such as potassium oxide ($K_2O$), compounds containing sulfur, calcium, or magnesium, such as magnesium oxide (MgO), as well as chlorides. Contaminants may also include other materials, such as hair, undigested solids, and bedding.

The disclosed system and method can reduce the levels of such contaminants without the use of flocculants or polymers. In one embodiment, the disclosed system and method can be used in association with CAFOs to process animal waste and help livestock producers dispose of and reuse the waste in accordance with legal, ethical, and professional guidelines.

Figure 2:
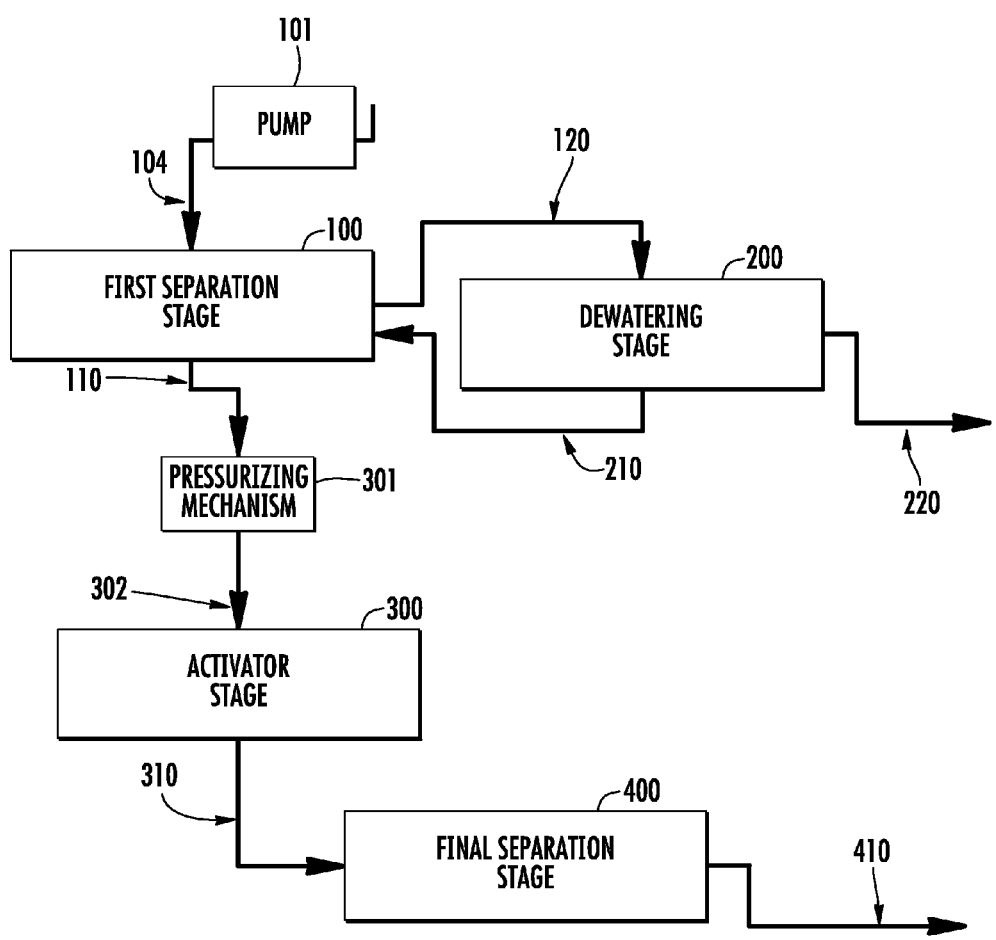
FIG. 2 is a high-level schematic flow chart of a waste separation and processing system, showing interconnectivity.

Referring to FIG. 1, an embodiment of the disclosed system and method includes four major stages: 1) a first separation stage 100; 2) a dewatering stage 200; 3) an activator stage 300; and 4) a final separation stage 400. In an alternate embodiment, the four major stages may be arranged as shown in FIG. 2. The stages disclosed herein are for general reference; embodiments of the disclosed system and method may occur in fewer or more stages and in different orders. Embodiments of the disclosed system and method may have elements of individual disclosed stages occurring in multiple separate stages. Elements of the disclosed system and method may have elements of multiple disclosed stages occurring in a single stage.

First Separation Stage 100

Figure 3:
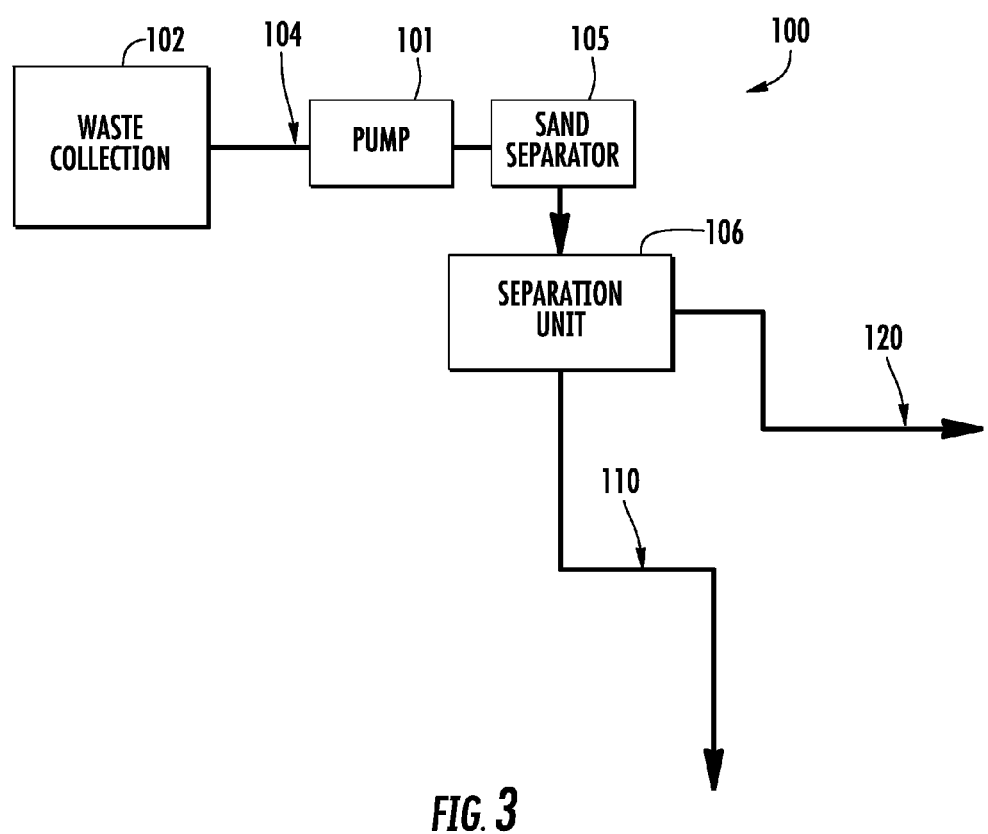
FIG. 3 is a schematic flow chart of the first separation stage, as shown in FIGS. 1 and 2.

Referring to FIG. 3, animal waste is collected in a waste collection 102. The waste collection 102 may be a waste holding tank, a live feed of waste, a lagoon, a pit, a settling basin, or another source of a slurry stream 104. The slurry stream 104 may be a solid and liquid mixture of animal waste. The slurry stream 104 may be comprised of other matter than animal waste that includes a contaminant component to be extracted, such as non-animal waste. A slurry stream 104 may be comprised of feces, urine, water, wasted feed, hair, bedding, and other contaminants. The slurry stream 104 may have any amount of solids. Typically, the slurry stream 104 has less than about 15% solids.

The slurry stream 104 is then transported from the waste collection 102 to a separation unit 106 by pump 101. Pump 101 may be a diaphragm pump. In a particular implementation, pump 101 is a double diaphragm pump, such as the DD-EC Series of double diaphragm pumps sold by Wastecorp Pumps, arranged in a single-in and single-out configuration. The pump 101 may be capable of transferring solids having a diameter of up to about 2.25 inches or about 50% by volume. The pump 101 may utilize flapper valves. Pump 101 may be capable of handling a slurry stream 104 with solids having a diameter of up to about 2.25 inches without substantially breaking up the solids, which can increase the efficiency of at least one of the First separation stage 100, the Dewatering stage 200, and the overall system.

In certain implementations where the slurry stream 104 includes high sand content, the slurry stream 104 may pass through a sand separator 105 before entering the separation unit 106. The sand separator 105 may include a slurry stream input, a water input (not shown), a sand output (not shown), and an effluent output. The effluent stream that exits the effluent output is transported into the separation unit 106. The water enters near the bottom of the sand separator 105. The slurry stream 104 enters near the top of the sand separator 105, where it will be gravity fed downward to be mixed and cleaned by the water. The sand is then lifted out of the sand separator by an auger type device where it is then discharged through the sand output. Sand discharged from the sand separator 105 may contain moisture but may contain minimal amounts of organic matter, allowing the moisture to be easily removed through drainage or other methods. Moisture removed from the sand at this point may be reused as a portion of the supply of water entering through the water input. Moisture removed from the sand may also be introduced to the effluent stream, the first liquid stream 110, the second liquid stream 210, or the combined liquid stream 302 (all described below). The sand separator 105 may be capable of removing approximately 80% to 90% by weight of the sand in the slurry stream 104. As used herein, the term slurry stream 104 may represent a slurry stream that has or has not been passed through a sand separator 105.

Referring again to FIG. 3, the separation unit 106 separates from the slurry stream 104 a first liquid stream 110 and a solid stream 120. In one embodiment, the separation unit 106 is a drum separator. The drum separator separates a first liquid stream 110 from the slurry stream 104 through the process of screening, where the waste stream, such as a manure stream, passes through a drum screen 136 (shown in FIG. 4). As the slurry stream 104 is moved across the drum screen 136, liquids pass through the screen and solids move across the screen. To increase the efficiency of the screening, the screen may be continually scraped or washed clean. Other embodiments may use other screening techniques, such as shaker screens, backwashing filters, standard filters, or other methods.

Figure 4:
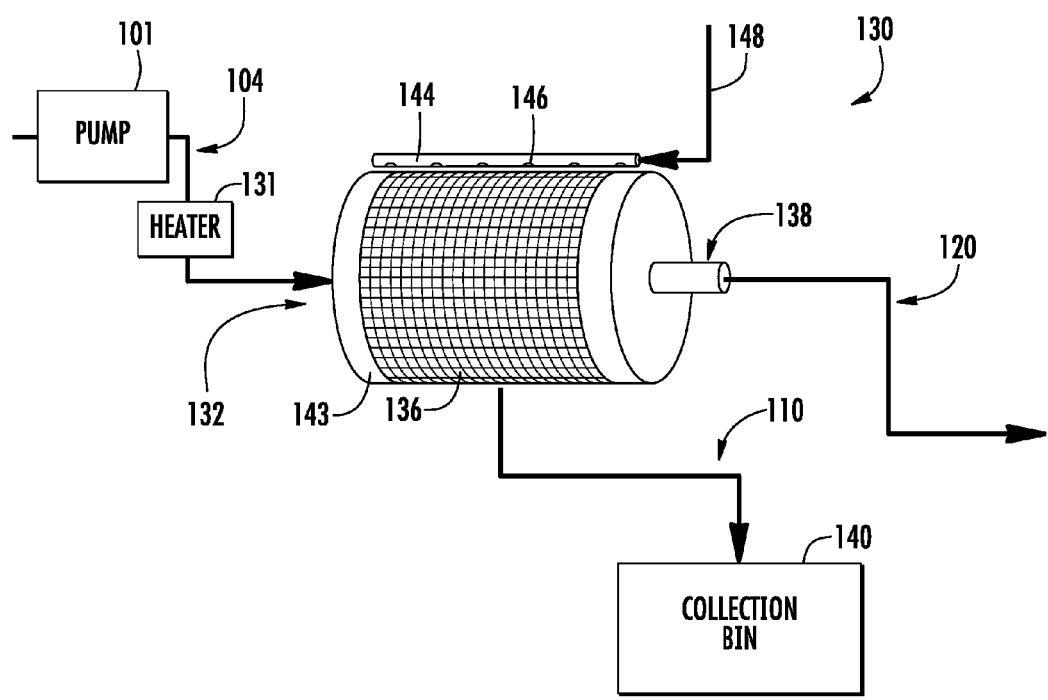
FIG. 4 is a representation of a separation unit as shown in FIG. 3.
Figure 15:
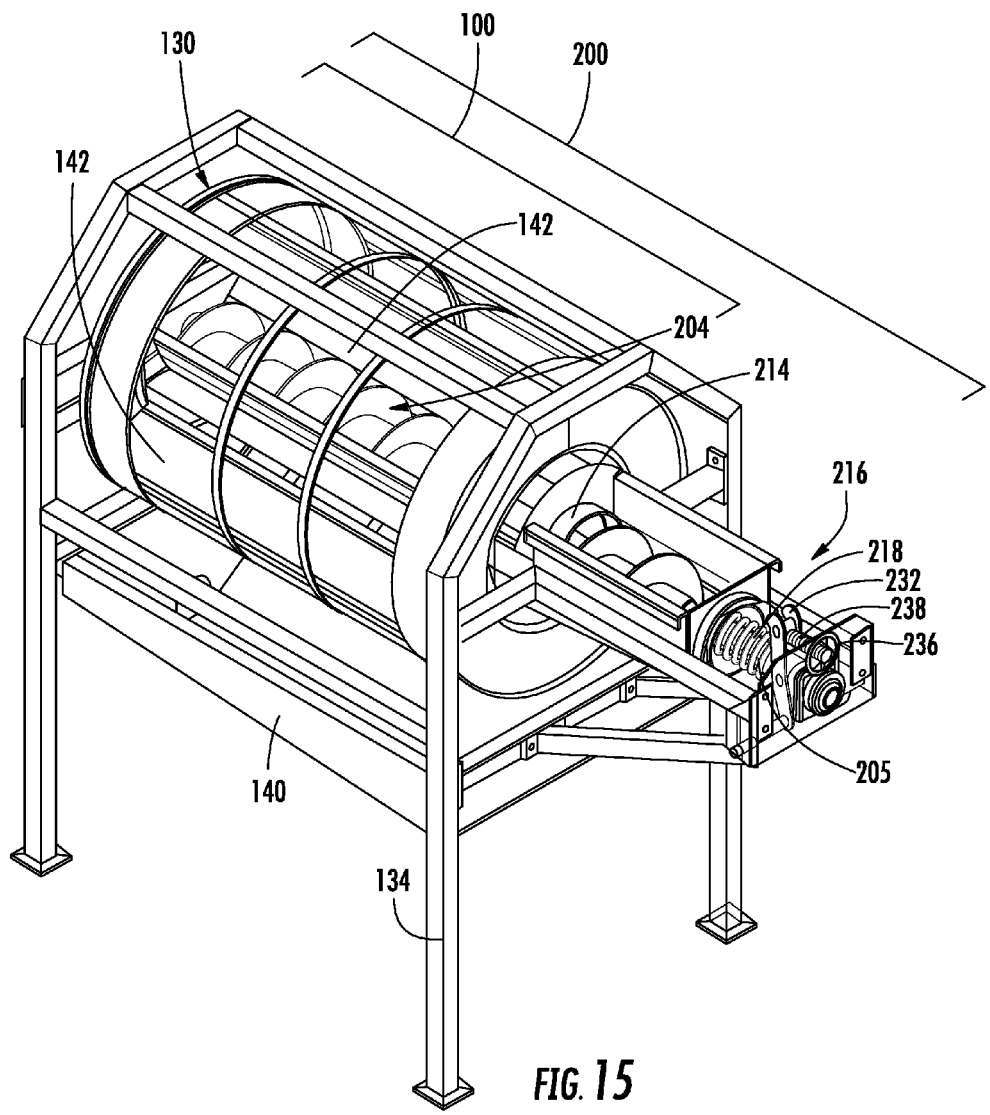
FIG. 15 is a representation of an embodiment of the first separation stage and the dewatering stage embodied in a single piece of equipment, with the drum screen and cylindrical screen removed.
Figure 16:
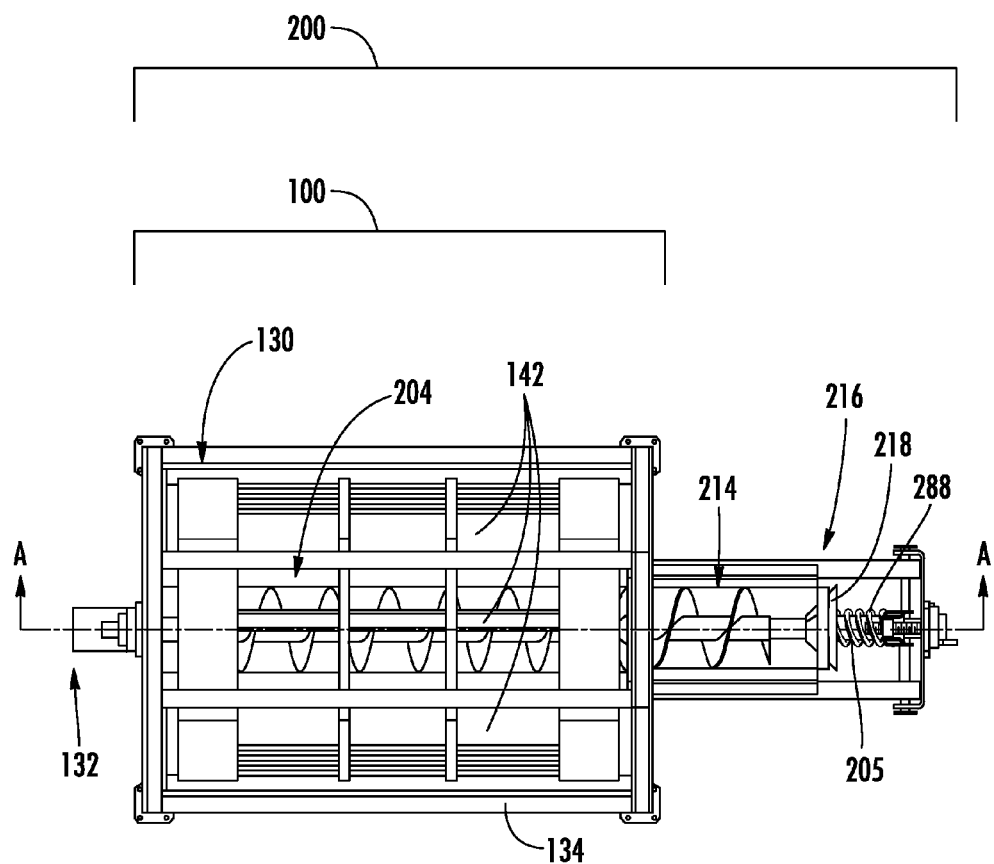
FIG. 16 is an overhead view of an embodiment of the first separation stage and the dewatering stage embodied in a single piece of equipment, with the drum screen removed.
Figure 17:
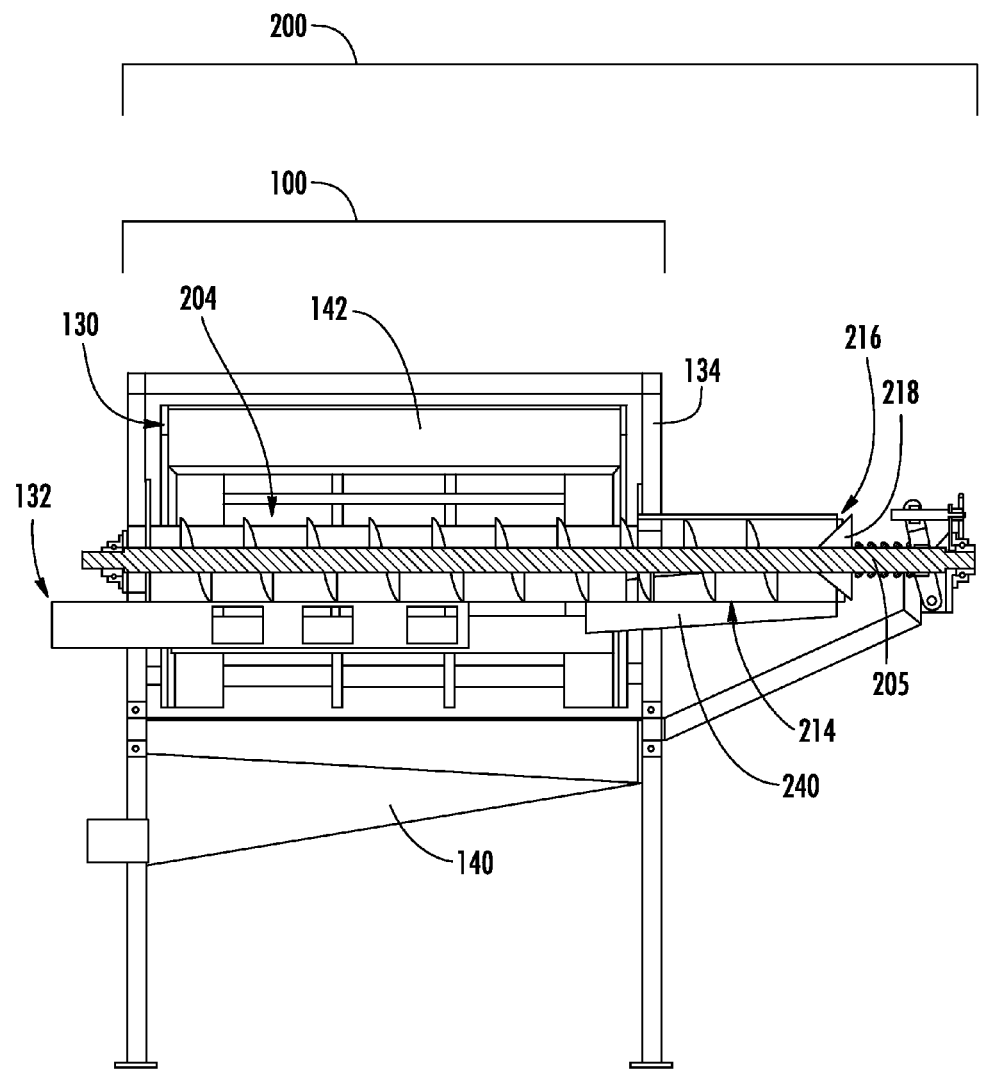
FIG. 17 is a cross-sectional view of an embodiment of the first separation stage and the dewatering stage embodied in a single piece of equipment, with the drum screen removed, taken across the section indicated in FIG. 16.
Figure 18:
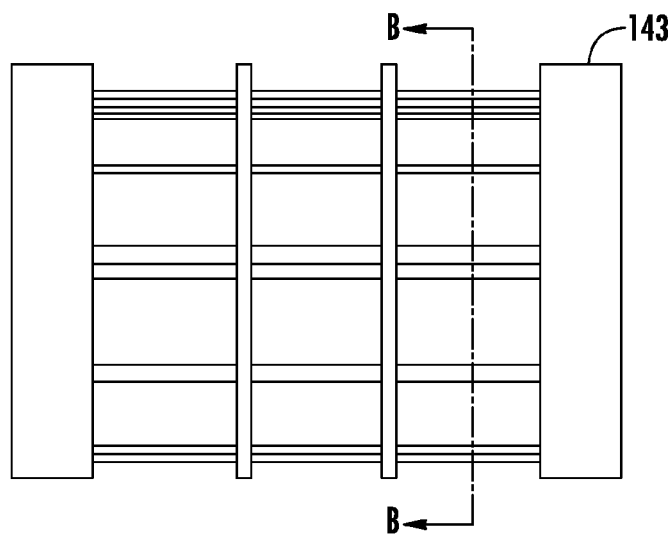
FIG. 18 is a representation of an exemplary rotating drum with the drum screen removed.
Figure 19:
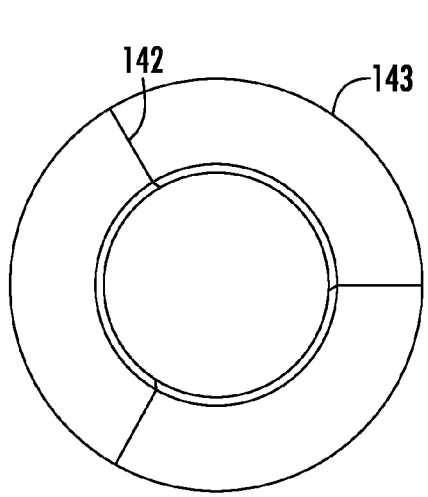
FIG. 19 is a cross-sectional view of an exemplary rotating drum taken across the section indicated in FIG. 18.
Figure 20:
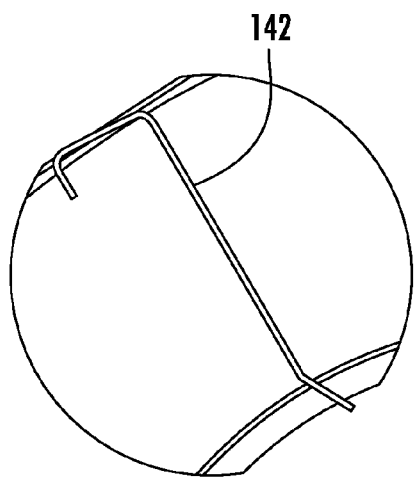
FIG. 20 is a detail view of an exemplary rotating fin.
Figure 21A:
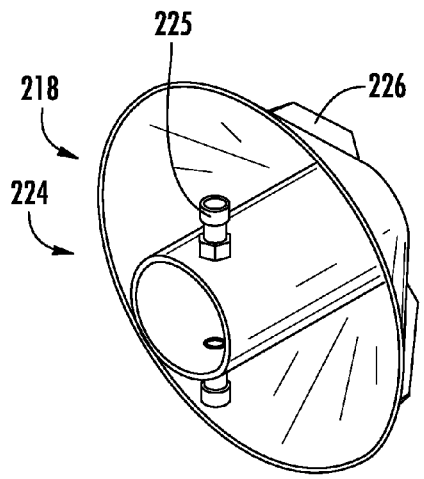
FIG. 21a is a representation of an exemplary bladed cone with set screws.
Figure 21B:
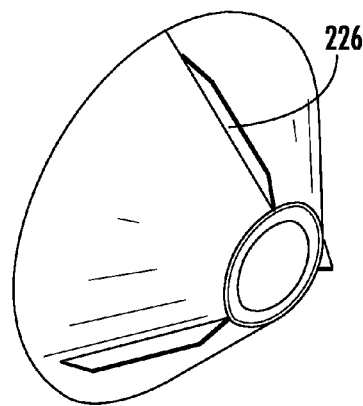
FIG. 21b is a representation of an exemplary bladed cone with set screws.
Figure 21C:
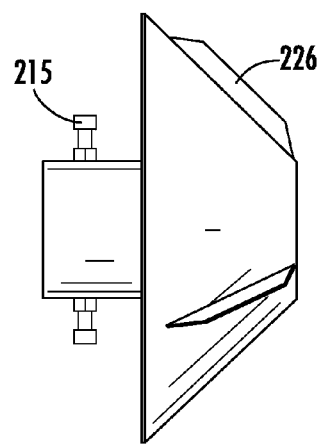
FIG. 21c is a representation of an exemplary bladed cone with set screws.
Figure 21D:
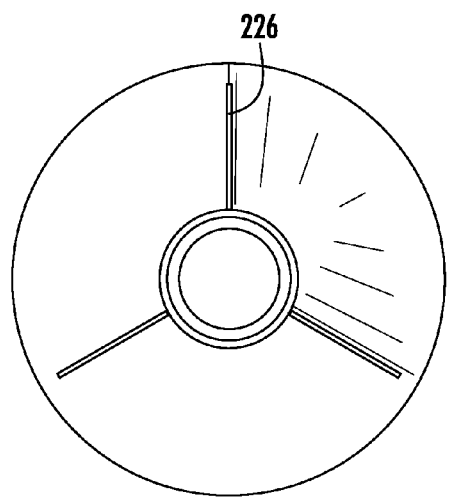
FIG. 21d is a representation of an exemplary bladed cone with set screws.
Figure 22A:
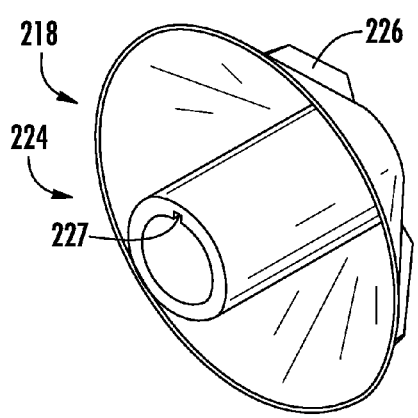
FIG. 22a is a representation of an exemplary bladed cone with a keyed recess.
Figure 22B:
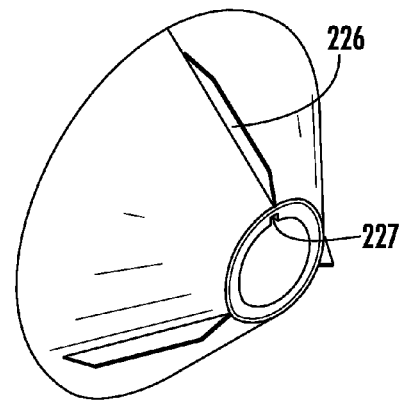
FIG. 22b is a representation of an exemplary bladed cone with a keyed recess.
Figure 22C:
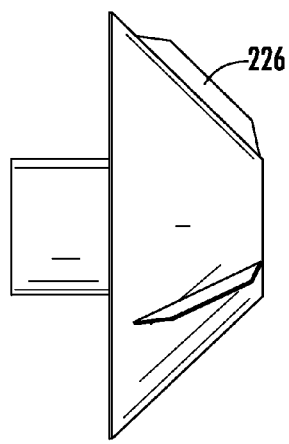
FIG. 22c is a representation of an exemplary bladed cone with a keyed recess.
Figure 22D:
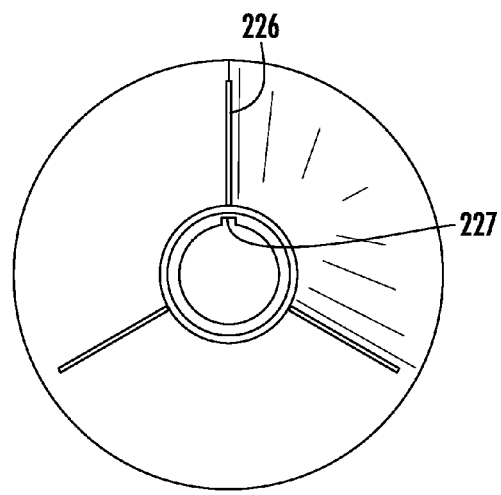
FIG. 22d is a representation of an exemplary bladed cone with a keyed recess.

Referring to FIG. 4, the slurry stream 104 enters a rotating drum 130 through the drum input 132. In some embodiments, the slurry stream 104 may pass through a heater 131 to raise the temperature of the slurry stream 104. The heater 131 may be a gas fired tube and shell heat exchanger, as disclosed in U.S. Pat. No. 6,394,042, the disclosure of which is hereby incorporated by reference. Referring to FIG. 17, in some embodiments, the drum input 132 may comprise an attachment point on the outside of the rotating drum 130 that connects to a piece of metal tubing suspended within the rotating drum 130. The slurry stream 104 is able to exit the metal tubing of the drum input 132 and fall into the rotating drum 130 through openings in the metal tubing. Referring to FIGS. 17-19, the rotating drum 130 may include a fixed frame 134 and a plurality of fins 142 attached to a rotating frame 143. These fins 142 will herein also be referred to as scoops. FIGS. 18-20 show an embodiment of the rotating frame 143 and fins 142. The fins 142 may have a bent shape, as shown in FIGS. 19 and 20. Referring to FIGS. 15-17, the rotating frame 143 is powered by an external motor (not shown) or other source of kinetic energy. Referring back to FIG. 4, a drum screen 136 may be attached to the rotating frame 143 so that it rotates with respect to the fixed frame 134. In an alternate embodiment, the drum screen 136 may be attached to the fixed frame 134 so that it may be held rotationally fixed with respect to the fixed frame 134. In some embodiments, the drum screen 136 is affixed using pressure clips or other methods that facilitate easy removal and reassembly.

Referring to FIGS. 15-17, the slurry stream 104 may be dropped into the internal region of the rotating drum 130. The rotating frame 143 may rotate with respect to the fixed frame 134 and cause the fins 142 to rotate with respect to the fixed frame 134. As one of the rotating fins 142 passes the lowest point of its travel, it may begin to lift up partial-solids from the slurry stream 104 that have not passed through the drum screen 136. As the one of the fins 142 nears the highest point of its travel, the partial-solids it lifted up may fall into a collection area connected to the drum output 138. A conveying device may provide motive force to push the partial-solids out from the drum output 138. As shown in FIGS. 15-17 and described below, the collection area and conveying device may be the screw press 204 of the dewatering stage 200.

During the first separation stage 100, as the slurry stream 104 passes over the drum screen 136, a first liquid stream 110 passes through the drum screen 136 and is collected in a collection bin 140. The solid stream 120, lifted from the drum screen 136 and falls into the collection area from where it is conveyed out of the drum output 138. As shown in FIGS. 15-17 and described below, the solid stream 120 may be lifted from the drum screen 136 and fall directly into the dewatering unit 206 partially housed within the separation unit 106.

Referring to FIG. 4, the drum screen 138 is held fixed with respect to the outer shell 134. In this embodiment, the rotation of the fins 142 about the drum's longitudinal axis permits the screen's openings to be constantly cleared, allowing greater separation efficiency and requiring less maintenance and downtime than other traditional screening processes. The drum screen 138 is held fixed with respect to the rotating frame 143. In this embodiment, the drum screen 138 may be rotated past a spray bar 144 configured to continuously clear the screen. The spray bar 144 contains a plurality of spray bar jets 146. As spray bar fluid 148 is pressurized into the spray bar 144, it is spayed out of the spray bar jets 146 and through the drum screen 138, physically clearing any openings in the drum screen 138 which may have been clogged or occluded. The spray bar fluid 148 may come from a clean water source, the first liquid stream 110, the second liquid stream 210, or another fluid source. This integrated backwashing system allows the First Separation Stage 100 to run with greater efficiency for longer periods of time, requiring less maintenance and downtime than other traditional screening processes.

Dewatering Stage 200

Figure 5:
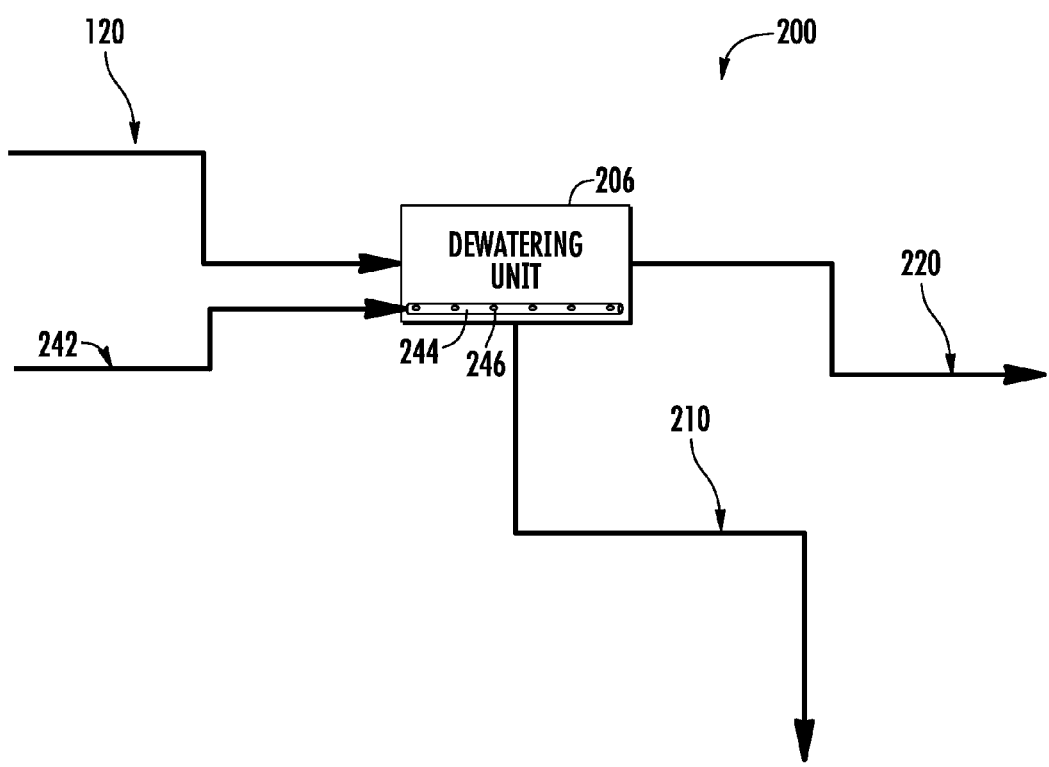
FIG. 5 is a schematic flow chart of the dewatering stage as shown in FIGS. 1 and 2.

After the solid stream 120 is separated from the slurry stream 104, it enters a dewatering stage 200. In this dewatering stage 200, as shown in FIG. 5, the solid stream 120 passes through a dewatering unit 206 to produce a second liquid stream 210 and a solid waste stream 220. The solid waste stream 220 contains a reduced level of liquid, such as less than about 70% by volume. The solid waste stream 220 preferably contains a reduced level of liquid, such as less than about 65% by volume. The solid was stream 220 preferably contains a reduced level of liquid, such as less than about 10-50% by volume.

Figure 6:
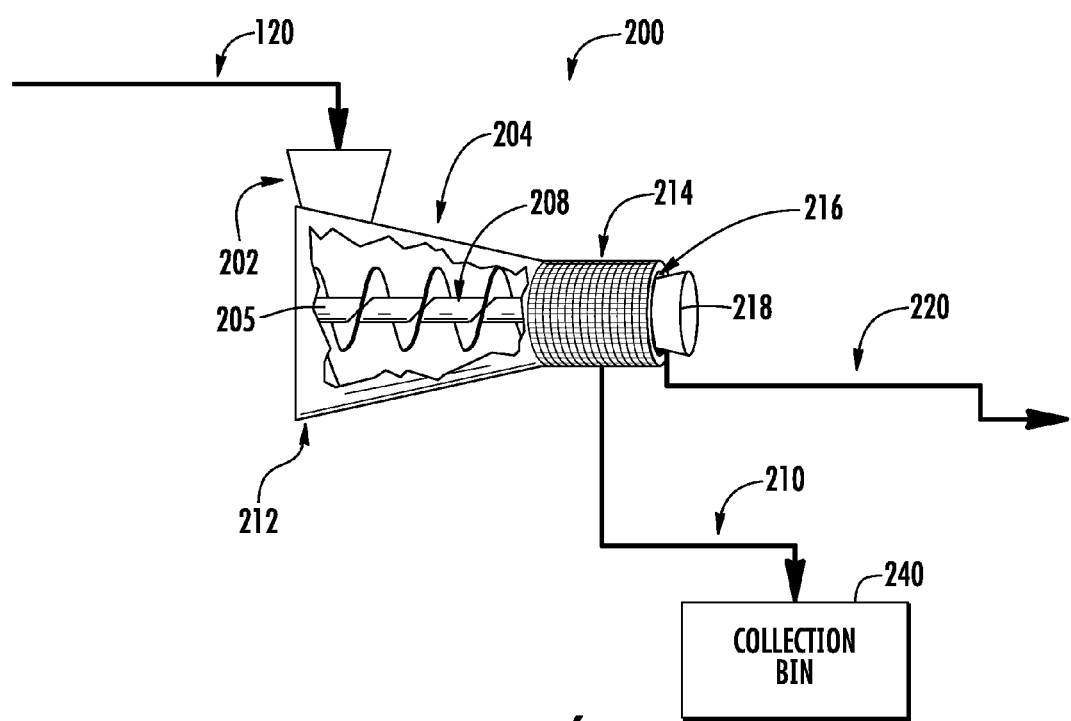
FIG. 6 is a cut-away representation of a dewatering unit as shown in FIG. 5.

FIG. 6 shows a typical implementation of a dewatering unit 206 where the solid stream 120 is deposited into a screened sleeve 202 before passing through a screw press 204. The screw press 204 may include an auger 208 in the center of a screw housing 212, which forces the solid stream 120 through the screw housing 212, past a cylindrical screen 214, and towards a screw press output 216. At the screw press output 216 is an occluding piece 218 which at least partially occludes the screw press output 216 to provide backpressure to the solid stream 120 within the screw press 204. At least a portion of any remaining liquids in the solid stream 120 is pressed through a screened portion of the cylindrical screen 214 to create a second liquid stream 210. The second liquid stream 210 is collected in a collection bin 240. The collection bin 240 may be separate from or the same as the collection bin 140 shown in FIG. 4. Solids that pass through the screened sleeve 202 are pressed through the cylindrical screen 214 by the auger 208 to the screw press output 216 and discharged as a solid waste stream 220. The auger 208 rotates about a central axis of the central drive shaft 205.

The rate of rotation of the auger 208 may be held constant or may be adjusted to control the moisture content of the final solid waste stream 220, thereby controlling the amount of dewatering taking place in the dewatering stage 200. Additionally, control of the amount of dewatering can be accomplished by adjusting the axial displacement of the occluding piece 218 to occlude more or less of the screw press output 216, thereby providing more or less backpressure. The occluding piece 218 may be rotationally coupled to the central drive shaft 205, may be rotationally coupled to the screw housing 212, or may be rotationally uncoupled relative to the central drive shaft 205 and the screw housing 212.

Referring to FIG. 23, an embodiment of the occluding piece 218 is shown as a spring-controlled cone 222 axially positioned along the central drive shaft 205 using a spring 228 with one end supported by a spring retaining block 230 positioned around the central drive shaft 205 and held in place by spring control linkages 232. Detail of the cylindrical screen 214 is not shown in FIG. 23, but the screened portion of the cylindrical screen 214 may continue to the end of the cylindrical screen 214 at the screw press output 216, or may terminate before the end of the cylindrical screen 214. The spring retaining block 230 may be positioned axially with respect to the central drive shaft 205 via displacement of the spring control linkages 232. The spring control linkages 232 may be displaced via rotation of the linkage shaft 234 by external means. As shown in FIGS. 15-17, displacement of the spring control linkages may be effected by turning a screw adjustment knob 236, which rotates an adjustment screw 238, causing the spring control linkages 232 to become displaced and thereby control axial displacement of the spring retaining block (not shown). Referring back to FIG. 23, by adjusting the axial displacement of the spring retaining block 230, the force imparted by the spring 228 on the spring-controlled cone 222 may be changed, thus changing the amount of back-pressure provided by the spring-controlled cone 222 on the solid waste stream 220 exiting the screw press output 216. The backpressure of the spring-controlled cone 222 may be adjusted while the dewatering unit 206 is running. The spring-controlled cone 222 may be advantageous for applications where the slurry stream 104 contains approximately 10% solids or less.

Referring to FIGS. 21A-D and 22A-D, embodiments of the occluding piece 218 are shown as bladed cones 224 positionable about the central drive shaft 205 of the screw press 204. Each bladed cone 224 may contain a plurality of small blades 226. In an embodiment, the bladed cone 224 has three approximately 3.375" long, approximately 0.5" to 0.25" deep tapered wedge shaped blades 226, each spaced radially 120 degrees apart and having approximate widths of 0.1875". Other configurations of blades may be used with more or fewer blades and with blades of larger or smaller dimensions. The bladed cone 224 may be rotationally and axially coupled to the central drive shaft 205 at a desired axial location along the length of the central drive shaft 205. As shown in FIGS. 21A-D, such rotational and axial coupling may be achieved by the use of one or more set screws 225. The desired axial location may depend on the size of the solids in the particular slurry stream 104 used. The bladed cone 224 may be rotationally coupled to the central drive shaft 205, but axially coupled to a back-pressure control mechanism, such as the spring 219 and spring retaining block 230 disclosed above. As shown in FIGS. 22A-D, the bladed cone 224 may be rotationally coupled by the use of a keyway or keyslot 227 which is capable of being positioned about a keyed portion on an embodiment of the central drive shaft 205. In other embodiments not shown, the bladed cone 224 may have a keyed portion which is positionable within a keyway or keyslot in the central drive shaft 205. Rotational coupling of the bladed cone 224 to the central drive shaft 205 may result in a decreased chance of blockage in the screw press 204 when dealing large solids. The bladed cone 224 may be advantageous for applications where the slurry stream 104 contains approximately 10% solids or more.

Referring back to FIG. 2, other embodiments of the dewatering stage 200 may use alternate or additional dewatering techniques to separate the solid stream 120 into a second liquid stream 210 and a solid waste stream 220. Examples of other dewatering techniques include, but are not limited to, rotary vacuum filters, centrifugation, drying beds, filter presses, continuous belt filter presses, and thermal drying. The solid waste stream 220 may be further processed to remove more liquid content that can be added to the second liquid stream 210. Additionally, the second liquid stream 210 may be further screened prior to being used in the activator stage 300.

Referring to FIG. 5, the dewatering unit 206 may be equipped with at least one cleaning nozzle 244. Each cleaning nozzle 244 may contain one or more cleaning nozzle jets 246. As cleaning nozzle fluid 242 is pressurized into the cleaning nozzle 244, it is spayed out of the cleaning nozzle jets 246 and onto various parts of the dewatering unit 206, physically clearing those parts of residual solids which may have stuck to or caked on those parts. The cleaning nozzle fluid 242 may come from a clean water source, the first liquid stream 110, the second liquid stream 210, or another fluid source. This integrated cleaning system allows the dewatering unit 206 to run with greater efficiency for longer periods of time, requiring less maintenance and downtime than other traditional dewatering units.

Referring to FIGS. 15-17, in some embodiments, the first separation stage 100 and dewatering stage 200 may take place in a single piece of equipment that contains a rotating drum 130 and a screw press 204. Some embodiments may be constructed as the devices disclosed in U.S. Pat. Nos. 6,395,187 and 6,651,822, both of which are incorporated herein by reference. In certain embodiments, the drum output 138 and its associated piping and conveying device are embodied in the screw press 204. In these embodiments, at least one fin 132 lifts the partial-solids and drops them in an opening in the screw press 204. Some embodiments utilize three rotating fins 142. As one rotating fin 142 rotates, it collects partial-solids that have not passed through the drum screen (not shown) and drops the partial-solids into an opening in the screw press 124. These partial-solids that are dropped into the screw press 124 effectively make up solid stream 120.

Figure 7:
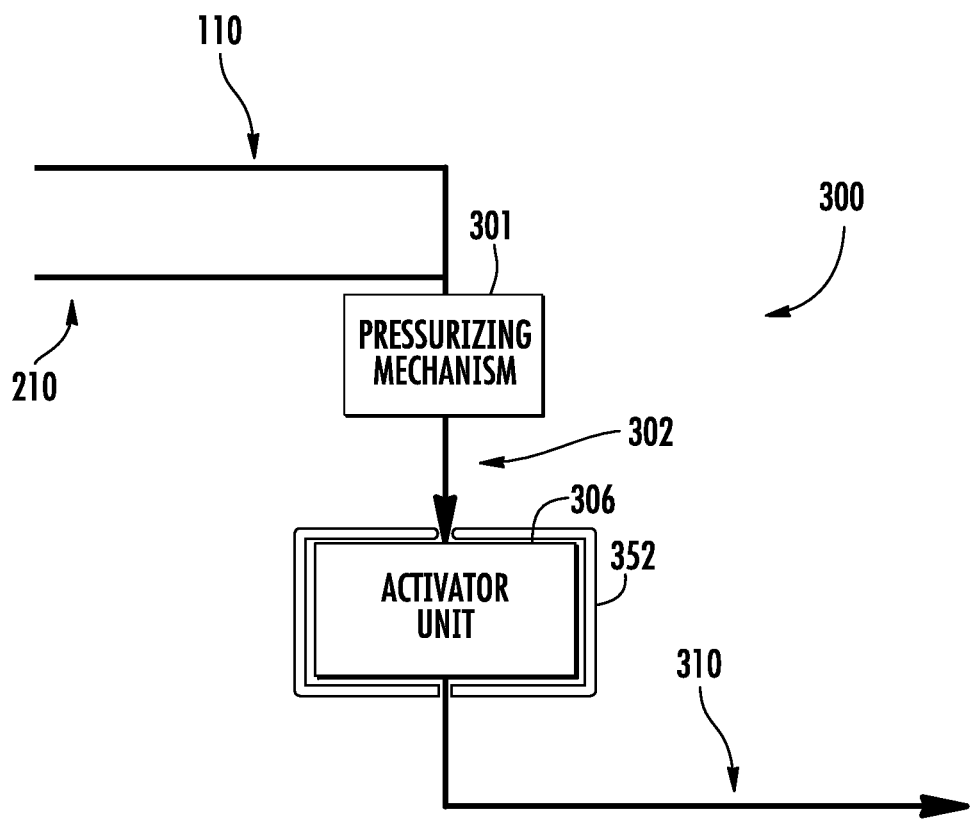
FIG. 7 is a schematic flow chart of the activator stage as shown in FIGS. 1 and 2.

As shown in FIGS. 2 and 15-17, in an embodiment, the second liquid stream 210 is collected in collection bin 240 before being passed into the rotating drum 130, where it is processed in the same general fashion as the slurry stream 103. In this embodiment, the first liquid stream 110 is collected in the collection bin 140 and passed on to the activator stage 300. In such an embodiment, as in other embodiments, the fluid passed to the activator stage 300 may be also referred to as the combined liquid stream 302 at least when it represents a combination of both the first liquid stream 110 and the second liquid stream 210. In some embodiments, the second liquid stream 210 may combine with the first liquid stream 110 via re-screening within the rotating drum 130, as described above. As shown in FIG. 7, in an embodiment, the first liquid stream 110 and second liquid stream 210 may combine to create a combined liquid stream 302 immediately prior to entering the activator unit 306. In such an embodiment, the first liquid stream 110 and second liquid stream 210 may be combined at any time before entering the activator unit 306, whether before or after the first liquid stream 110 and second liquid stream 210 are collected in either a single collection bin 140 or in collection bin 140 and collection bin 240 respectively.

Referring back to FIGS. 15-17, in an embodiment, the rotating fins 142 of the First Separation Stage 100 and the auger 208 of the Dewatering Stage 200 are both driven by either a single variable speed drive motor (not shown) or separate variable speed drive motors (not shown). The rotating fins 142 of the First Separation Stage 100 and the auger 208 of the Dewatering Stage 200 may be driven by other motive force generators. An embodiment of the First Separation Stage 100 and the Dewatering Stage 200 may be capable of handling the slurry stream 104 at approximately 110 gallons per minute.

Activator Stage 300

Referring to FIG. 7, the first and second liquid streams 110 and 210 from the first separation stage 100 and the dewatering stage 200 are combined into a combined liquid stream 302, which is then passed through an activator stage 300. In an activator unit 306, the physical or chemical characteristics of the combined liquid stream 302 are altered to create an activated liquid stream 310. A pressurizing mechanism 301 creates pressure that forces the combined liquid stream 302 through the activator unit 306.

The activator unit 306 may be surrounded in whole or in part by a temperature control layer 352. This temperature control layer 352 may comprise insulation materials designed to assist the activator unit 306 in retaining heat during use in cold environments. In some embodiments, the R-value of the insulation materials is at least about 0.5 BTU per inch. The temperature control layer 352 may also comprise heating elements capable of generating heat. Examples of such heating elements include resistive conductors or ceramic heating elements. The temperature control layer 352 may also include both insulation materials and heating elements.

The pressurizing mechanism 301 may be in the form of an impeller pump or other similar fluid pressurizing device, such as a self-priming centrifugal pump with an impeller. In a particular implementation, the pressurizing mechanism 301 is a TFCC Series™ 3 inch self-priming, centrifugal pump manufactured by Wastecorp Pumps. The pressurizing mechanism 301 may be capable of pumping approximately 460 gallons per minute and may be capable of producing pressure equivalent to a maximum head of approximately 115 feet. The use of an impeller pump fragments any remaining solids in the combined liquid stream 302 that were not separated in the First separation stage 100 or the Dewatering Stage 200. Breaking up of any remaining solids in the combined liquid stream 302 increases the efficiency and life of the activator unit 306. The pressurizing mechanism 301 may contain an impeller made of A60-40-18 ductile iron. The impeller may be capable of operating at approximately 2400 revolutions per minute.

The flow rates of pump 101 and pressurizing mechanism 301 may be individually adjusted. At least one of pump 101 and pressurizing mechanism 301 may be driven by a fluid. In an embodiment, both pump 101 and pressurizing mechanism 301 are driven by electrical current and flow rates may be controlled by variable frequency drives. The adjustment of flow rates of the pump 101 and pressurizing mechanism 301 allows throughput to be maximized and improves overall efficiency. By controlling the flow rates of the pump 101 and the pressurizing mechanism 301, the volume in and out of the First separation stage 100, Dewatering Stage 200, and Activator Stage 300 may be adjusted as necessary. For example, the flow rates in and out of the First separation stage 100, Dewatering Stage 200, and Activator Stage 300 may be synchronized. The flow rates of the pump 101 and pressurizing mechanism 301 may be controlled by a control box electrically or fluidly coupled to both pump 101 and pressurizing mechanism 301. In an embodiment, both pump 101 and pressurizing mechanism 301 are non-submersed in the liquid being pumped, allowing for easy service and maintenance.

The activator unit 306 may be any suitable device capable of producing charged particles in the combined liquid stream 302. The activator unit 306 may also induce changes in temperature and pressure, which may cause the formation of small or micro bubbles within the combined liquid stream 302. The small or micro bubbles may be directed against a metal surface of the activator unit 306, resulting in charged particles being stripped from the metal surface and remaining in the combined liquid stream 302, thus forming the activated liquid stream 310. The small or micro bubbles, for example, may be less than about 50 microns in diameter. Due to their nature, the small or micro bubbles may last for long periods of time and have electrical charges that are very effective at attracting suspended floating particles or contaminants.

Figure 8:
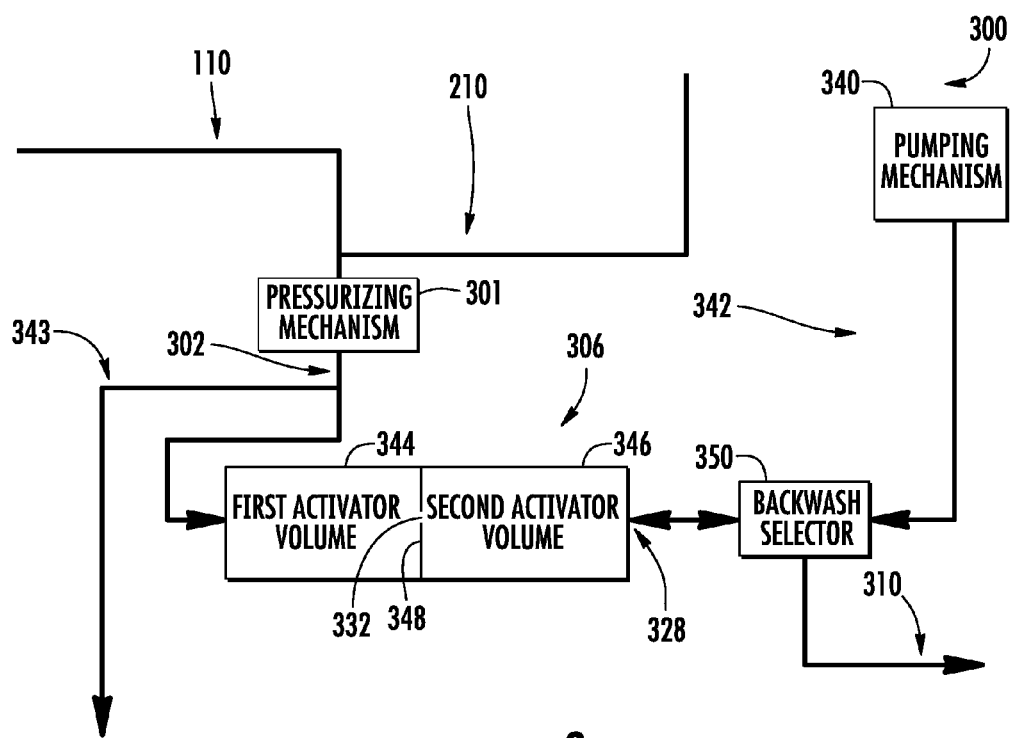
FIG. 8 is a schematic flow chart of an activator unit.

Referring to FIG. 8, the activator unit 306 may be comprised of a first activator volume 344 and a second activator volume 346 separated by a barrier 348. The barrier 348 has at least one hole 332 or other opening allowing fluid communication between the first activator volume 344 and the second activator volume 346.

Examples of an activator unit 306 capable of producing an activated liquid stream 310 are disclosed in U.S. Pat. No. 5,482,629 entitled "Method and Apparatus for Separating Particles from Liquids" and U.S. Pat. No. 6,106,787 entitled "Method and Apparatus for Treating Fluids to Alter Their Physical Characteristics," the entire disclosures of which are incorporated herein by reference.

Figure 9:
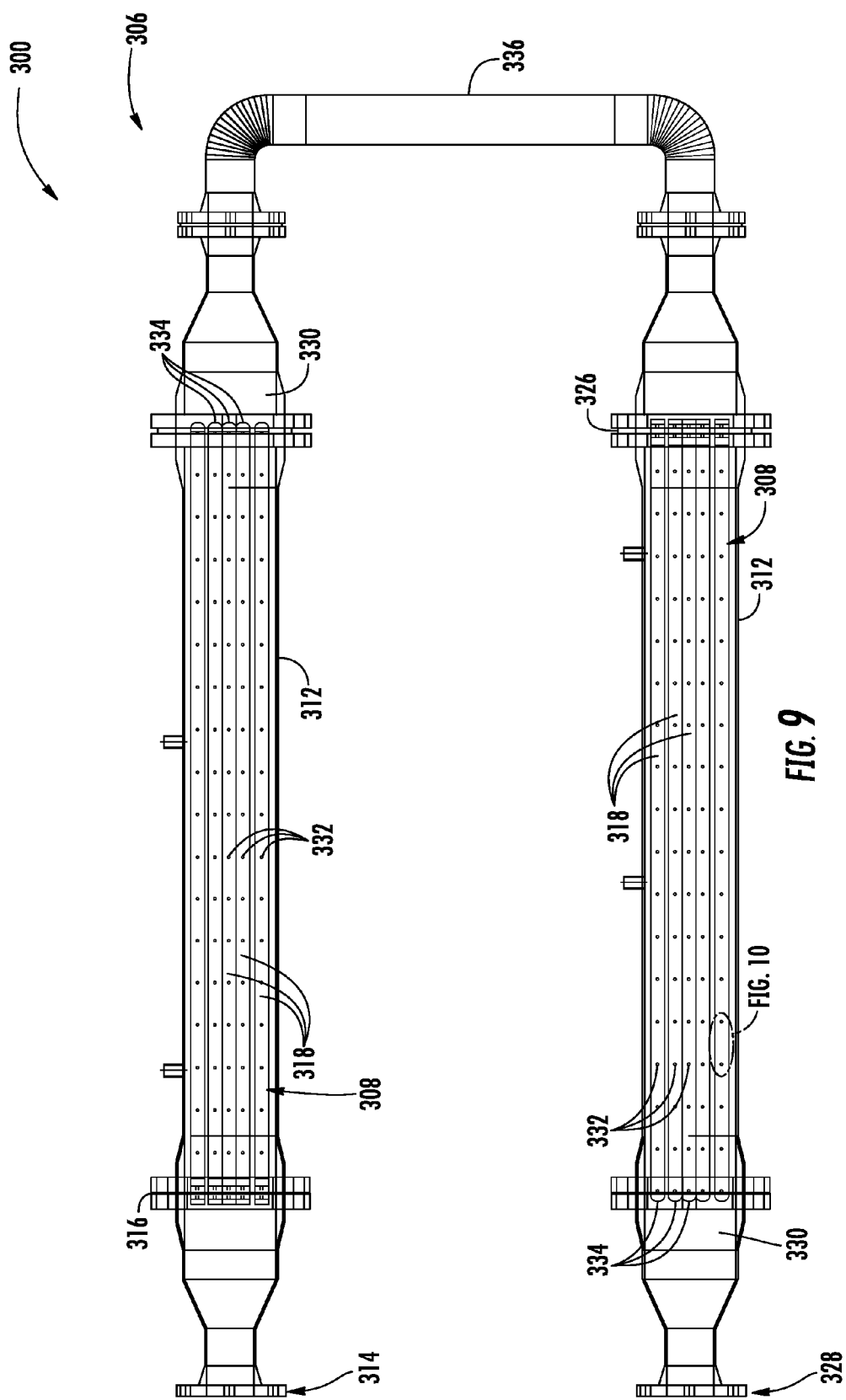
FIG. 9 is a cross-sectional view of an exemplary activator unit.
Figure 10:
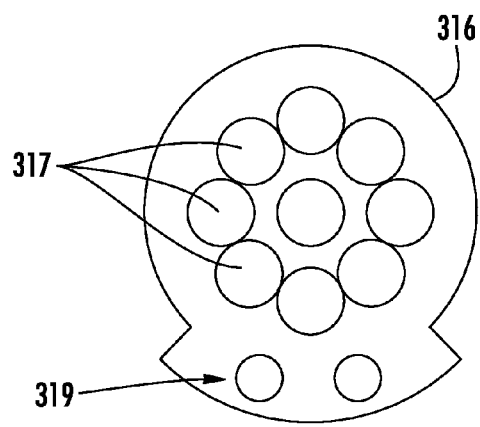
FIG. 10 is an elevational view of a bundle of tubes housed in a shell.

As shown in FIGS. 9 and 10, a device for activating the combined liquid stream 302 may comprise two shells 312. The shells 312 may be elongate and cylindrical, or some other suitable shape. The shells 312 may be arranged in spaced relation to one another and connected together in fluid communication, such as by the connection tube 336 shown. The shells 312 may be connected to the connection tube 336 in any suitable manner, such as with flanges and fasteners (e.g., bolts). Each shell 312 may house a bundle 308 of tubes 318.

The tubes 318 may be elongate and cylindrical, or some other suitable shape. The bundle 308 may be supported in relation to a plate 316. The plate 316 may have holes 317 therein equivalent in number to the number of tubes 318 in the bundle 308. The plate 316 additionally may have one or more stay holes 319 which interact with stay features (not shown) so that the plate 316 maintains a constant alignment with respect to the shell 312. The tubes 318 may be sealed in relation to the plate 316 so as to be in fluid communication with the holes 317. The number and size of the tubes 318 may vary in accordance with the size of the shell 312 and the desired clearance between the shell 312 and the bundle 308.

In an exemplary embodiment, the shell 312 may have a diameter that is about six inches (15.2 cm) and a length that is about 53 inches (114.3 cm). The shell 312 may be coupled to a reducer 330. The shell 312 may house tubes 318 having a length of about 54 inches (137.2 cm), so that the tubes 318 extend beyond the shell 312 and into the reducer 330. The shell 312 may house a bundle 308 of nine spaced apart tubes 318 that are about ¾ inch (1.8 cm) in diameter. The tubes 318 may be arranged so that the inner surface of the shell 312 is spaced in a range of about ¼ to ½ inches (0.6 to 1.2 cm) from the bundle 308, i.e., there is a gap of about ¼ to ½ inch between the inner surface of the shell 312 and the outer surface of the tubes 318. The plate 316 may comprise nine holes 317, one for each tube 318 in the bundle 308. Although the tubes 318 and holes 317 may be arranged in any suitable manner, the tubes 318 shown are spaced concentrically about a center tube 318, substantially equidistantly from the center tube 318 and substantially equidistantly apart from one another. Hence, the bundle 308 has eight tubes 318 about a center tube 318 and the plate 316 correspondingly has eight holes 317 about a center hole 317.

In certain embodiments, the shell 312 may have a diameter that is between about two inches and four inches, and a length that is between about 15 inches and about 40 inches. In certain embodiments, the tubes 318 may have a length of between about 16 inches and about 41 inches, and diameters of between about ¼ inch and about ¾ inch. In certain embodiments, the shell 312 may have a length of up to approximately 71 inches and the tubes 38 may have lengths of up to approximately 72 inches. In some embodiments, the lengths of the shell 312 and tubes 318 may individually or both extend beyond 71 inches and 72 inches, respectively, with or without increasing the size of the respective diameters of the shell 312 and tubes 318 beyond four inches and ¾ inch, respectively.

Figure 12:
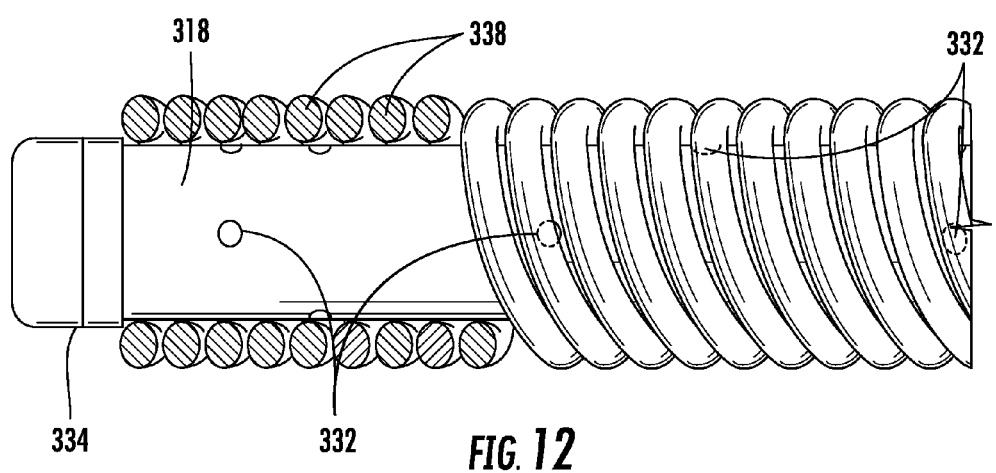
FIG. 12 is an enlarged portion of an exemplary tube wrapped with a coil.

Continuing with reference to the drawings, each tube 318 may comprise a wall having a plurality of radially bored holes 332. The holes 332 may be axially and radially spaced, or arranged in some other suitable manner. The exemplary tubes 318 may be provided with four radially spaced rows of holes 332 (e.g., approximately 90 degrees apart). Each hole 332 may have a diameter of about 1/10 inch (3 mm) and be axially spaced apart about 3 inches (75 mm) center-to-center from one another. In this way, about 17-18 holes 332 may be provided per row. It should be appreciated that the holes 332 in one row may be axially staggered in relation to the holes 332 in a radially adjacent row, as shown in FIG. 12. An end of each tube 318 may be substantially closed, such as with an end cap 334 or other suitable structure, and may or may not include a hole. It should be appreciated that the cross-sectional areas of the holes 332 in relation to the cross-sectional area of the tube 318 may reduce the risk of back pressure or flow restriction during operation of the device for activating the combined liquid stream 302.

The shells 312 and tubes 318 may be formed of metal or metal alloy or another substance that is coated or plated with metal or metal alloy. For example, the exemplary shells 312 may be about 70 percent copper and about 30 percent nickel by weight, or be formed of a ferrous metal (e.g., black iron) and the inner surface of the shells 312 may be coated with a copper-nickel alloy, comprising about 70 percent copper and about 30 percent nickel, although other materials may be suitable. The tubes 318 may be comprised of copper, although other materials may be suitable. In certain embodiments, the shells 312 and tubes 318 may be formed of a non-metal, such as Polyvinyl Chloride ("PVC") tubing.

In operation, the combined liquid stream 302 may flow through the activator unit 306 (i.e., in a clockwise direction when viewing FIG. 9) via the activator input 314 and into one shell 312 (i.e., from the left to the right in the upper shell when viewing FIG. 9), through the holes 332 in the tubes 318 therein. The combined liquid stream 302 may then flow through the connection tube 336 into the other shell 312 (i.e., from the right to the left in the bottom shell when viewing FIG. 9) and through the holes 332 in the tubes 318 therein, and then out of the activator via the activator output 328. Within each shell 312, the combined liquid stream 302 exits through the holes 332 in the tubes 318 and onto the inner surface of the shell 312. As this occurs, electrons are freed from the metal or metal alloy such as copper-nickel alloy on the inner surface of the shell 312. The freed electrons combine with the molecules in the combined liquid stream 302 to create the activated liquid stream 310. In combination with the activating process, these exit streams may cause a rapid formation and collapse of vapor pockets in the liquid waste when tensile stress is super imposed. These exit streams may assist in altering the physical or chemical characteristics of the combined liquid stream 302. It should be understood that due to the reaction in the first, upper shell 312 of the embodiment shown in FIG. 9, some of the liquid passing into the second, lower shell 312 will already be an activated liquid stream 310. After passing through all shells 312 of the activator unit 306, the activated liquid stream 310 exits the activator unit 306 via activator output 328.

Figure 11:
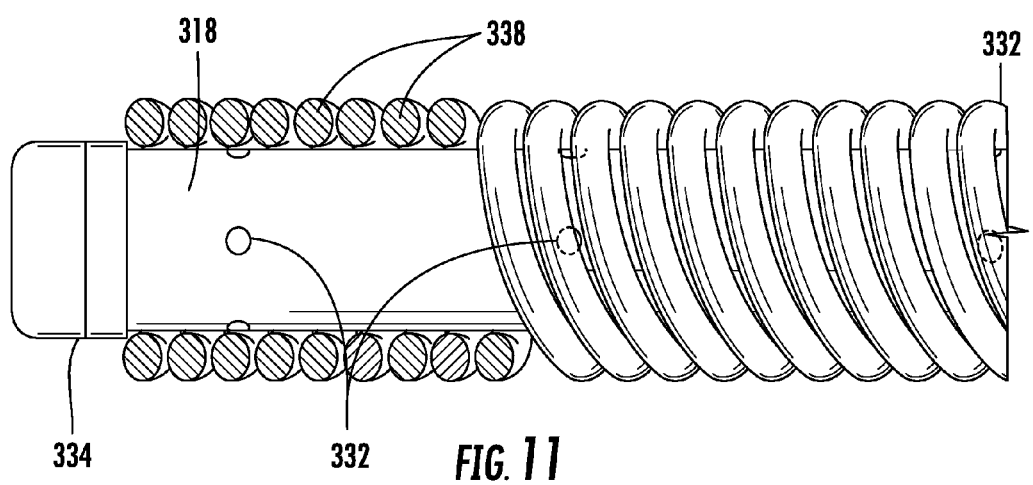
FIG. 11 is an enlarged portion of an exemplary tube wrapped with a coil.

It should be appreciated that the shell 312 may have a roughened or irregular inner surface that presents more metal or metal alloy surface area, such as copper, to the turbulent action of combined liquid stream 302 that exits through the holes 332 in the tubes 318 within the shell 312. Additionally, a metallic coil, such as the coil 338 shown in FIGS. 11 and 12, which may be in the form of a helix of a metal or metal alloy having free electrons, such as copper or copper-nickel wire, may be wrapped around the tubes 318, for substantially the length of the outer surface of the tubes 318. As the combined liquid stream 302 exits through the holes 332 in the tubes 318, it may strike the coil 338, causing electrons to be freed from the coil 338. The freed electrons combine with the molecules in the combined liquid stream 302 to further charge the combined liquid stream 302. It should be appreciated that the coil 338 may provide freed electrons sufficient to charge the combined liquid stream 302 in the absence of a metal or metal coated shell. In such a case, the shell 312 may be formed of some other suitable material, such as a polymer, plastic, ceramic, other metal, or the like. In an embodiment, the shell is constructed of 4" PVC piping. In various embodiments, the activator unit 306 may be resized to be larger or smaller depending on the desired application and flow rates.

Figure 13:
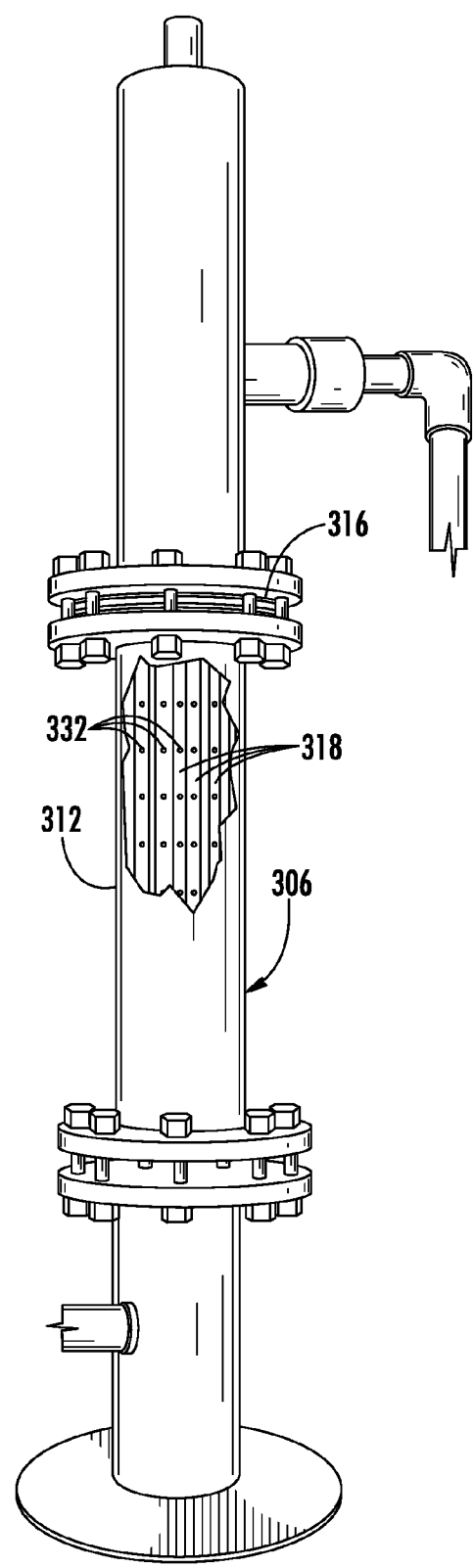
FIG. 13 is a cut-away representation of an exemplary activator unit as shown in FIG. 7.

Referring now to FIG. 13, there is illustrated an activator unit 306 for activating the combined liquid stream 302. Although the activator unit 306 is shown comprising only one shell 312, it should be appreciated that multiple shells 312 may be joined together. The activator unit 306 may be oriented upright, as shown in FIG. 13, or in a prone position, like the activator unit 306 shown in FIG. 9. The activator unit 306 may comprise a shell 312, which may be elongate and cylindrical, or some other suitable shape. The shell 312 may house a bundle 308 of tubes 318, which may be elongate and cylindrical, or some other suitable shape. The bundle 308 may be supported in relation to a plate 316 so as to be in fluid communication with holes 317 in the plate 316. The tubes 318 may comprise a plurality of radially bored holes 332, which may be axially and radially spaced, or arranged in some other suitable manner. An end of each tube 318 may be substantially closed, such as with a cap or other suitable structure, and may or may not include a hole therein.

In operation, the combined liquid stream 302 may flow into the shell 312 and exit through the holes 332 in the tubes 318 into the inner surface of the shell 312. Electrons freed from the metal or metal alloy, such as copper-nickel alloy, on the inner surface of the shell 312 may combine with the molecules in the combined liquid stream 302 to create the activated liquid stream 310. The activated liquid stream 310 may flow out of the activator unit 306 (i.e., in an upward direction when viewing FIG. 13).

Referring back to FIG. 7, the result of the activator stage 300 is an activated liquid stream 310 which allows for improved separation of contaminants from the activated liquid stream 310. As a result, the activated liquid stream 310 may have a greater percentage of separable contaminants than that of the combined liquid stream 302. Additionally, settling of the activated liquid stream 310 may be able to be fully conducted in a much shorter timeframe than settling of the combined liquid stream 302.

Referring to FIG. 8, an exemplary activator unit 306 may also be equipped with necessary pumps and valves to perform self-cleaning. An exemplary activator unit 306 equipped for self-cleaning may have a pumping mechanism 340 designed to pump backwashing fluid 342 through a backwash selector 350 and through the activator unit 306 via the activator output 328 (i.e. in the opposite direction in which the combined liquid stream 302 normally travels through the activator unit 306). The backwashing fluid 342 then flows past the inner wall of the shell 312 and past any coils 338 wrapped around the tubes 318. The backwashing fluid 342 is then pushed through the holes 332 in the walls of the tubes 318 and out through the activator input 314 (as shown in FIG. 9). As the backwashing fluid 342 passes by the various surfaces in the activator unit 306 and passes through the holes 332 and other openings in the activator unit 306, debris and built-up contaminants are cleaned out of the activator unit. While the activator is in the self-cleaning process, necessary valves may be switched so that the backwashing fluid 342 is not capable of traveling towards the final separation stage 400. The backwash selector 350 is fluidly coupled to the activator output 328. When the backwash selector 350 is in a first state, it allows the activated liquid stream 310 exiting the activator output 328 to leave the Activator Stage 300 and pass towards the Final Separation Stage 400. When the backwash selector 350 is in a second state, it allows the backwashing fluid 342 to flow into the activator output 328 in the reverse direction (i.e. right to left in FIG. 8). Additional valves (not shown) may be used to divert any used backwashing fluid 343 exiting the activator input 314 to a waste area for further use or treatment. Alternatively, in an embodiment not shown, the used backwashing fluid 343 exiting the activator input 314 may follow the path used by the combined liquid stream 302. When the self-cleaning process is complete and the activator is put back in normal use, the backwashing fluid 342 that had exited the activator unit 306 via the activator input 314 may travel back through the activator unit 306 before the combined liquid stream 302 reaches the activator unit 306. In another embodiment, additional valves (not shown) may be used to divert any used backwashing fluid 343 exiting the activator input 314 to the rotating drum 130.

The backwashing system may use the combined liquid stream 302 as the backwashing fluid 342, and the pressurizing mechanism 301 may be used as the pumping mechanism 340. The backwashing may be accomplished by altering the state of at least one valve (not shown) to allow the pressurizing mechanism 301 to pump the combined liquid stream 302 through the activator unit 306 in a reverse direction (i.e. from right to left in FIG. 8).

The pumping mechanism 340 and any required valves (not shown) may be controlled through an automated system which, when activated, engages the backwashing system automatically after a pre-determined criterion has been met. The pre-determined criterion may be elapsed time, volume of waste processed, volume of fluid treated, actuation of a backwashing button, or sensing of certain qualities of the activator unit 306, the pressurizing mechanism 301, or the activated liquid stream 310. For example, an exemplary backwashing system may be automatically activated if the activator unit 306 is overly clogged, the pressurizing mechanism 301 is working harder than usual, or the activated liquid stream 310 is losing more pressure than usual or is not being adequately activated. Other sensors may be used to automatically activate the backwashing system. The same automated system or a separate automated system may control the activation of the spray bar 144 used in the First Separation Stage 100 and the cleaning nozzle 244 used in the dewatering unit 206.

Final Separation Stage 400

In an embodiment of this invention, the activated liquid stream 310 is passed to a final separation stage 400 where remaining contaminants are removed from the activated liquid stream 310.

Figure 14:
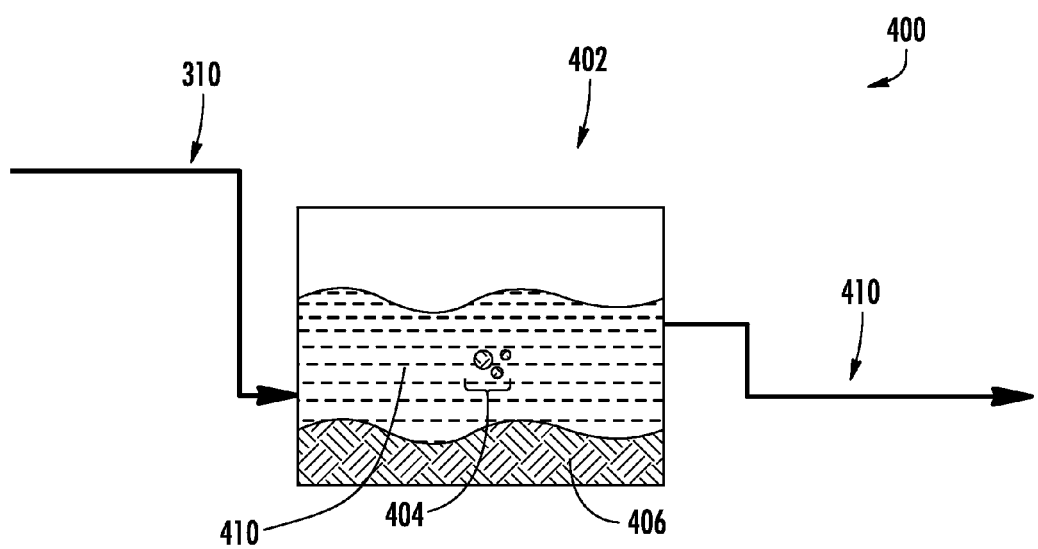
FIG. 14 is a schematic flow chart representation of the final separation stage as shown in FIGS. 1 and 2.

Referring to FIG. 14, in the final separation stage 400, the activated liquid stream 310 is transported to a settling lagoon 402, pit, or other suitable storage facility where settling may occur. Charged particles and small bubbles in the activated liquid stream 310 may attract contaminants and form contaminant particles that tend to sink to the bottom of the settling lagoon 402. As a result, the various contaminants can be separated with great speed and efficiency. The settling process may result in a level of clean water 410 above a mass of settled particles 406. The settled particles 406 may be disposed of, used for further purposes, or recycled in some fashion. The clean water 410 can be removed and used. The clean water 410 has a greatly reduced concentration of contaminants as compared to the combined liquid stream 302 or the activated liquid stream 310. This clean water 410 can be disposed of by irrigation or other suitable means.

Figure 24:
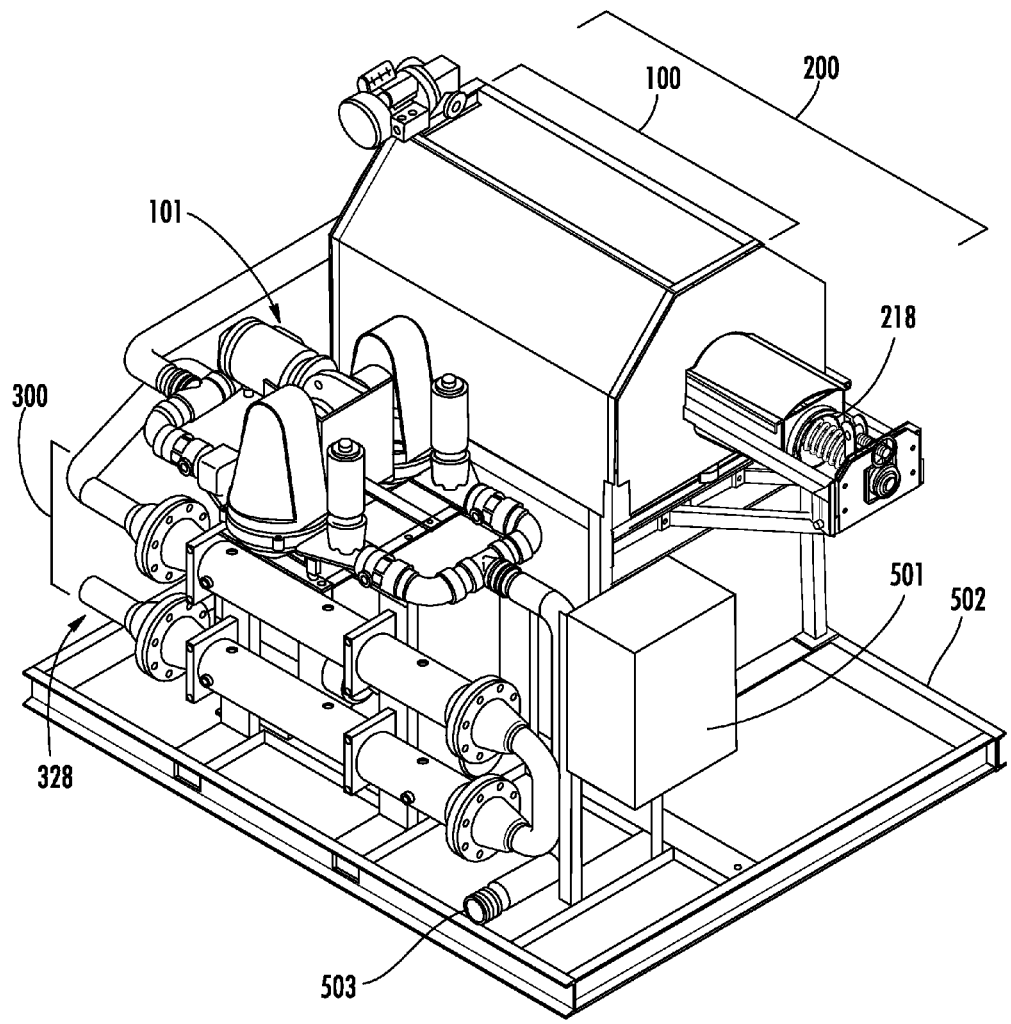
FIG. 24 is a representation of a first separation stage, dewatering stage, and activator stage packaged on a single base.
Figure 25:
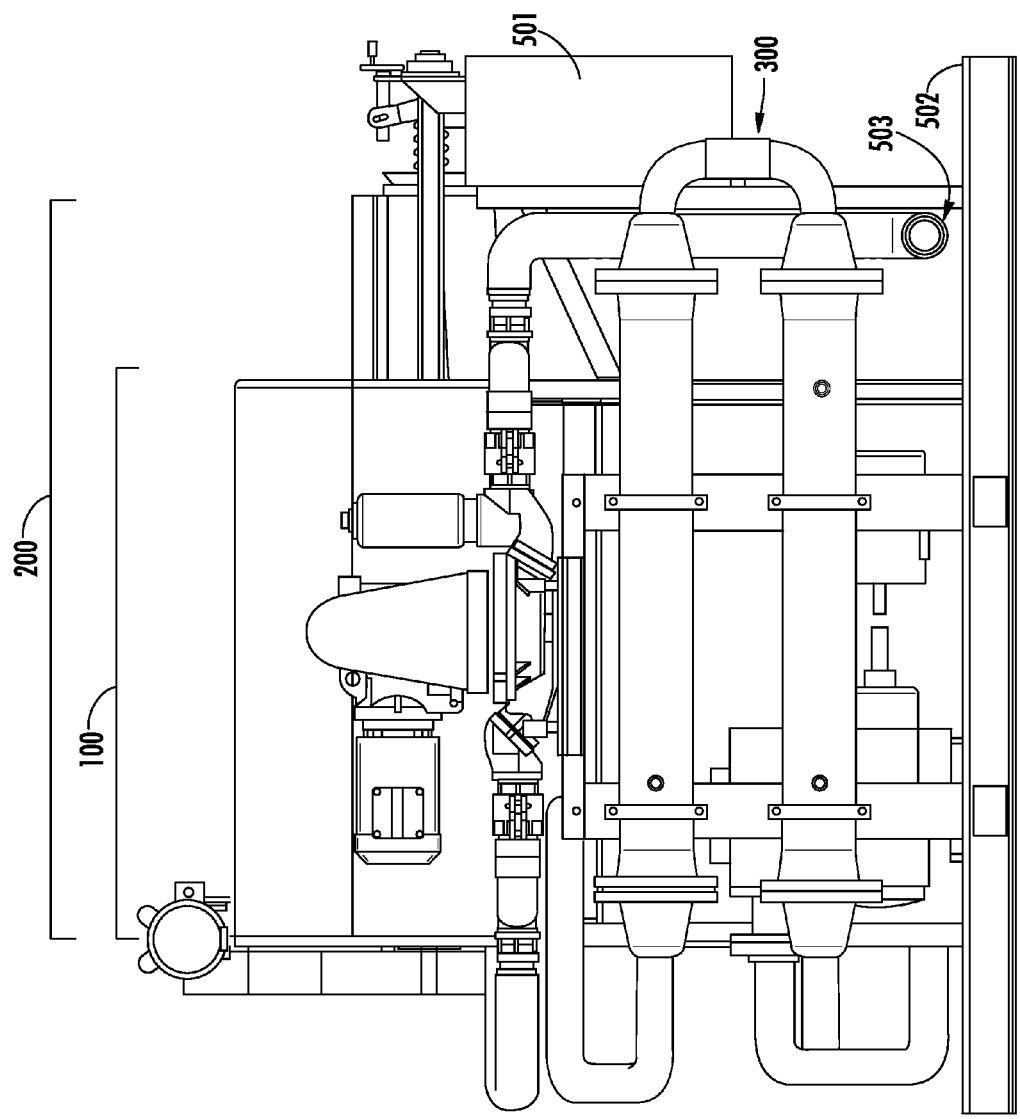
FIG. 25 is a side elevational representation of a first separation stage, dewatering stage, and activator stage packaged on a single base.
Figure 26:
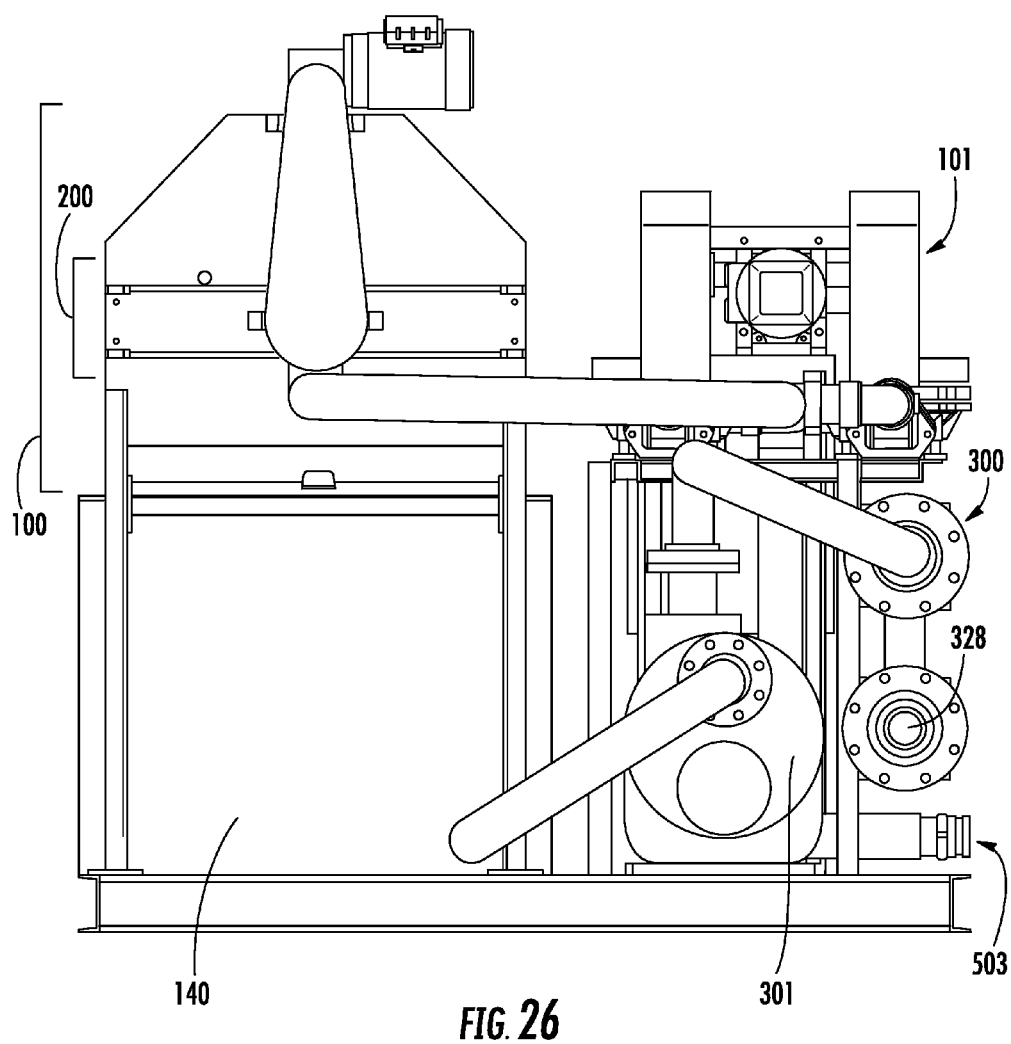
FIG. 26 is an elevational representation of a first separation stage, dewatering stage, and activator stage packaged on a single base.
Figure 27:
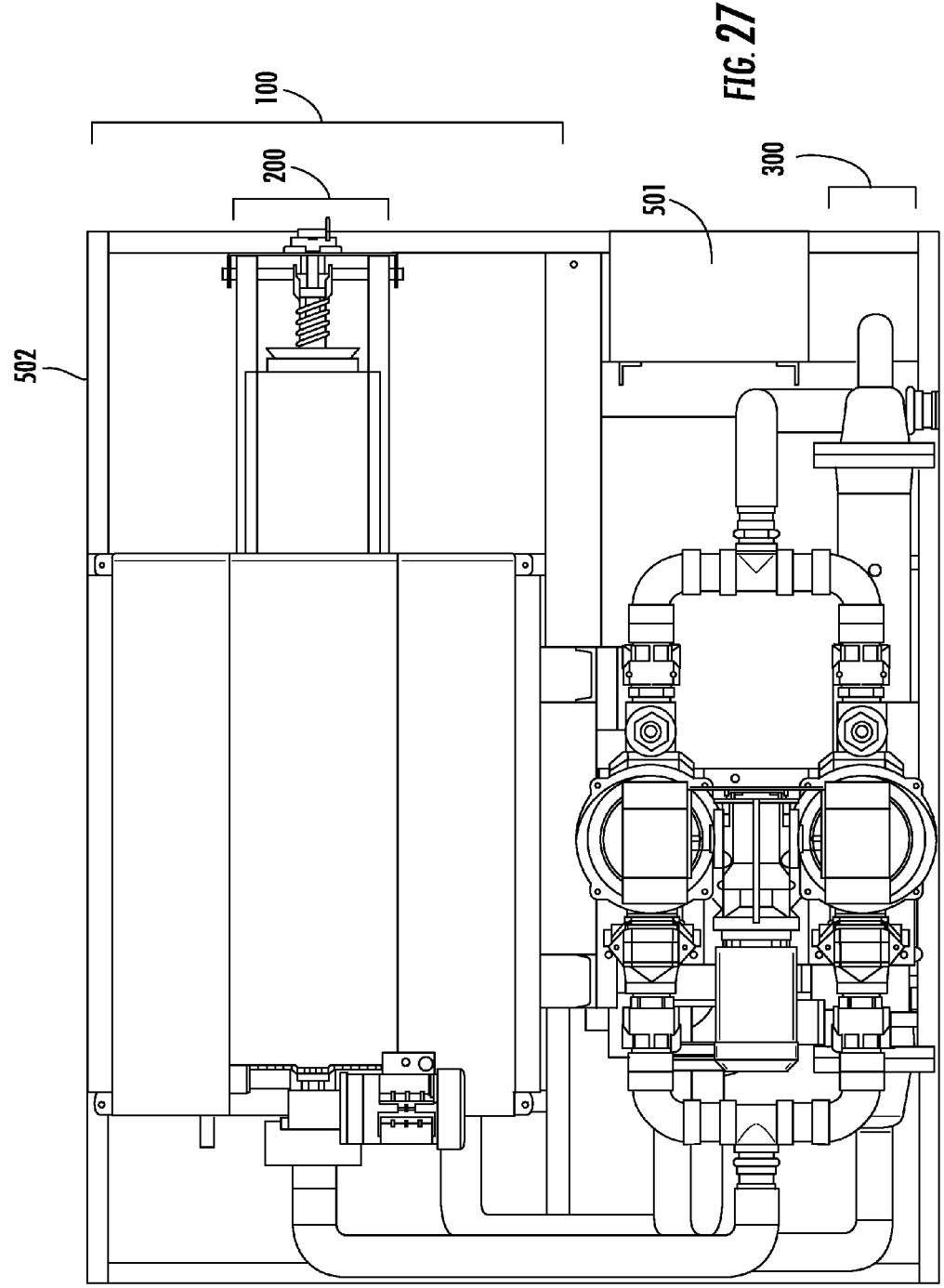
FIG. 27 is a top representation of a first separation stage, dewatering stage, and activator stage packaged on a single base.

Referring to FIGS. 24-26, an exemplary embodiment of the waste separation and processing system may include a base 502 supporting all necessary mechanisms for the first separation stage 100, the dewatering stage 200, and the activator stage 300. The base 502 may house a combined first separation stage 100 and dewatering stage 200 as shown and described above. Supplying the first separation stage 100 is a pump 101 in the form of a diaphragm pump that receives the slurry through its pump input 503. The combined liquid stream 302 is pressurized out of the collection bin 140 by a pressurizing mechanism 301 in the form of an impeller pump, which then pressurizes the combined liquid stream 302 through the activator unit 306, until the activated liquid stream exits the activator 306 at the activator output 328. Additionally, the base 502 supports a control unit 501. The control unit 501 may contain control surfaces, electronics, valves, or other means by which a user can control the various elements of the overall system. In some embodiments, the control unit 501 houses circuitry that controls the speeds of the motors turning the rotating drum and the auger and the flow rates of the pump 101 and pressurizing mechanism 301.

In some embodiments, the control unit 501 may control the amount of dewatering in the dewatering stage 200 by causing axial displacement of the occluding piece 218. The control unit 501 may be connected to the various elements it controls by way of mechanical cables (not shown), electrical cables (not shown), fluid tubes (not shown), or wirelessly. It will be appreciated by one having ordinary skill in the art that the control unit 501 may provide user feedback or automatic control of the various elements mentioned above through one or more sensors attached to one or more elements located on or near the base 502. For example, in an embodiment not shown, a sensor adapted to sense the temperature of the slurry as it enters the first separation stage 100 may be used by the control unit 501 to increase the amount of heat being applied to the slurry by a heating element located in-line with and prior to the first separation stage 100.

It should be appreciated by those skilled in the art that any number of different separation mechanisms of various design, size, material, and shape can be used to separate the activated liquid stream 310 and that the term "settling lagoon" is not intended to limit this disclosure to use only separation mechanisms of a particular design, size, material, or shape. It will be appreciated by those skilled in the art that other separation mechanisms may be used in place of or in addition to settling by settling lagoon 402 in order to separate any of the mixtures. In an exemplary system, the separation mechanism may be capable of separating the contaminants from the activated liquid stream 310.

Embodiments of the disclosed system and method may include additional screening or filtering devices placed before the input of or after the output of any stage or unit, depending upon the individual needs of the system. One particular embodiment includes an activated charcoal filter unit placed either before or after the activator stage 300. One embodiment includes the use of a self-cleaning or non-self-cleaning filter with a 100 micron or lower filtration size placed so as to filter the combined liquid stream 302 before it enters the activator unit 306.

Embodiments of the disclosed system and method may include a clarifier unit in-line placed before the input of or after the output of any stage or unit, depending upon the individual needs of the system. A particular embodiment includes a clarifier unit placed either before or after the activator stage 300.

Embodiments of the disclosed system and method may include additional heaters 131 positioned to heat the various streams at various points in the system, where necessary depending upon application and climate.

It also should be readily apparent to one skilled in the art that numerous pumps, valves, and other equipment may be added to or removed from the above described embodiments as necessary without departing from the spirit and scope of the invention.

The headings used in this description are inserted for readability purposes only and are not to be construed as limiting, in any way, the contents of this disclosure.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A system for processing slurries comprising:
a first separation device consisting of a screw press positioned partially within a rotating drum filter, the rotating drum filter having a drum screen and a rotating frame with scoops, wherein the rotating drum filter is adapted to separate a slurry that contains contaminants into a first liquid stream that exits through the drum screen and a solid stream that is lifted by the scoops and dropped into the screw press, wherein the screw press is configured to provide a forward motive force to push the solid stream towards a solids output by rotating an auger attached to a central drive shaft and the screw press is configured to provide backpressure upon the solid stream by occluding at least a portion of the solids output with an occluding piece, wherein the occluding piece is rotationally coupled to the central drive shaft, the occluding piece having at least one fin positioned to contact a portion of a solid waste stream as it exits the solids output, wherein the screw press is adapted to separate the solid stream into a second liquid stream and a solid waste stream, the first separation device configured to route the second liquid stream into the rotating drum filter to allow the second liquid stream to be re-screened and thus mixed with the first liquid stream to create a combined liquid stream;
a spray bar positioned in proximity to the drum filter and configured to spray a pressurized spray bar fluid through the drum screen;
a cleaning nozzle positioned in proximity to the screw press and configured to spray a pressurized cleaning nozzle fluid onto the screw press;
an impeller pump configured to pressurize the combined liquid stream through an activator device in a forward direction, wherein the activator device includes a barrier between a first activator volume and a second activator volume, the first activator volume being in fluid communication with the second activator volume via a plurality of openings in the barrier, an activator surface positioned within close proximity of the plurality of openings in the barrier, wherein the activator device is configured such that the pressurized flowing of the combined liquid stream through the plurality of openings in the barrier and past the activator surface results in an activated liquid stream, the activated liquid stream including charged particles, wherein the charged particles attract the contaminants to form contaminant particles within the activated liquid stream;
a backwashing system configured to pressurize a backwashing fluid through the activator device in a reverse direction; and
a second separation device adapted to receive the activated liquid stream and allow the contaminant particles to settle, resulting in a portion of clean water separable from a plurality of settled particles.

2. A system for processing slurries comprising:
a first separation device that includes a screw press positioned partially within a rotating drum filter, the rotating drum filter having a drum screen and a rotating frame with scoops, wherein the rotating drum filter is adapted to separate a slurry that contains contaminants into a first liquid stream that exits through the drum screen and a solid stream that is lifted by the scoops and dropped into the screw press, wherein the screw press is configured to provide a forward motive force to push the solid stream towards a solids output by rotating an auger attached to a central drive shaft and the screw press is configured to provide backpressure upon the solid stream by occluding at least a portion of the solids output with an occluding piece, wherein the occluding piece is rotationally coupled to the central drive shaft, the occluding piece having at least one fin positioned to contact a portion of a solid waste stream as it exits the solids output, wherein the screw press is adapted to separate the solid stream into a second liquid stream and a solid waste stream, the first separation device configured to route the second liquid stream into the rotating drum filter to allow the second liquid stream to be re-screened and thus mixed with the first liquid stream to create a combined liquid stream;

a pump configured to pressurize the combined liquid stream through an activator device in a forward direction, wherein the activator device includes a barrier between a first activator volume and a second activator volume, the first activator volume being in fluid communication with the second activator volume via a plurality of openings in the barrier, an activator surface positioned within close proximity of the plurality of openings in the barrier, wherein the activator device is configured such that the pressurized flowing of the combined liquid stream through the plurality of openings in the barrier and past the activator surface results in an activated liquid stream, the activated liquid stream including charged particles, wherein the charged particles attract the contaminants to form contaminant particles within the activated liquid stream; and a second separation device adapted to receive the activated liquid stream and allow the contaminant particles to settle, resulting in a portion of clean water separable from a plurality of settled particles.

3. The system of claim 2, further comprising a spray bar positioned in proximity to the drum filter and configured to spray a pressurized spray bar fluid through the drum screen.

4. The system of claim 2, further comprising a cleaning nozzle positioned in proximity to the screw press and configured to spray a pressurized cleaning nozzle fluid onto the screw press.

5. The system of claim 2, further comprising a backwashing system configured to pressurize a backwashing fluid through the activator device in a reverse direction.

6. The system of claim 2, further comprising a heater adapted to provide heat energy to at least one of the slurry, the first liquid stream, and the activated liquid stream.

7. The system of claim 2, wherein the barrier is a plurality of tube walls defining a plurality of tubes located within a shell, the first activator volume being defined in part by the plurality of tubes, the second activator volume being defined in part as a space between the plurality of tubes and the shell.

* * * * *